(12) United States Patent
Li et al.

(10) Patent No.: US 10,207,764 B2
(45) Date of Patent: Feb. 19, 2019

(54) BATTERY SAFETY ENCLOSURE

(71) Applicant: Zake IP Holdings, LLC, South Bend, IN (US)

(72) Inventors: Xingrui Li, Shenzhen (CN); Dan Zeng, Shenzhen (CN); Zeng Fanxin, Shenzhen (CN)

(*) Notice: Subject to any disclaimer, the term of this patent is extended or adjusted under 35 U.S.C. 154(b) by 100 days.

(21) Appl. No.: 15/407,970

(22) Filed: Jan. 17, 2017

(65) Prior Publication Data

US 2018/0127048 A1 May 10, 2018

Related U.S. Application Data

(63) Continuation-in-part of application No. 15/347,023, filed on Nov. 9, 2016, now Pat. No. 10,144,477.

(51) Int. Cl.
| | |
|---|---|
| *B62K 11/00* | (2006.01) |
| *B62K 3/00* | (2006.01) |
| *B62K 11/14* | (2006.01) |
| *B62M 7/12* | (2006.01) |
| *B62J 99/00* | (2009.01) |

(52) U.S. Cl.
CPC .............. *B62K 11/007* (2016.11); *B62J 99/00* (2013.01); *B62K 3/002* (2013.01); *B62K 11/14* (2013.01); *B62M 7/12* (2013.01); *B62J 2099/002* (2013.01); *B62J 2099/004* (2013.01); *B62J 2099/0013* (2013.01)

(58) Field of Classification Search
CPC ...... B62K 3/002; B62K 11/007; B62K 11/14; B62M 7/12; B62J 99/00; B62J 2099/004; B62J 2099/002; B62J 2099/0013
USPC .......................................................... 280/218
See application file for complete search history.

(56) References Cited

U.S. PATENT DOCUMENTS

| | | | | |
|---|---|---|---|---|
| 5,538,807 A | * | 7/1996 | Hagiuda | H01M 2/1016 429/100 |
| 6,378,642 B1 | * | 4/2002 | Sutton | B62D 61/08 180/208 |
| 9,376,155 B2 | * | 6/2016 | Ying | B62D 51/001 |
| 2005/0251948 A1 | * | 11/2005 | Ruffo | A47L 11/28 15/340.1 |

* cited by examiner

*Primary Examiner* — Tony H Winner
*Assistant Examiner* — Felicia L. Brittman
(74) *Attorney, Agent, or Firm* — Botkin & Hall, LLP

(57) ABSTRACT

A battery safety enclosure is provided that contains a battery pack and is attached to a vehicle with a frame. The enclosure has a flat surface that is close to and overlays a flat surface on the frame. The flat surface includes a vent port that is covered by a plug. If the battery pack should fail and release gas, the plug separates from the vent port and pressure is released in a controlled fashion. The flat surface of the enclosure further contains release channels that are recessed from the flat surface on the enclosure. The release channels slow and disperse the release of flammable gas. The safety enclosure may contain a control circuit board that controls the charging and discharging of the battery.

5 Claims, 21 Drawing Sheets

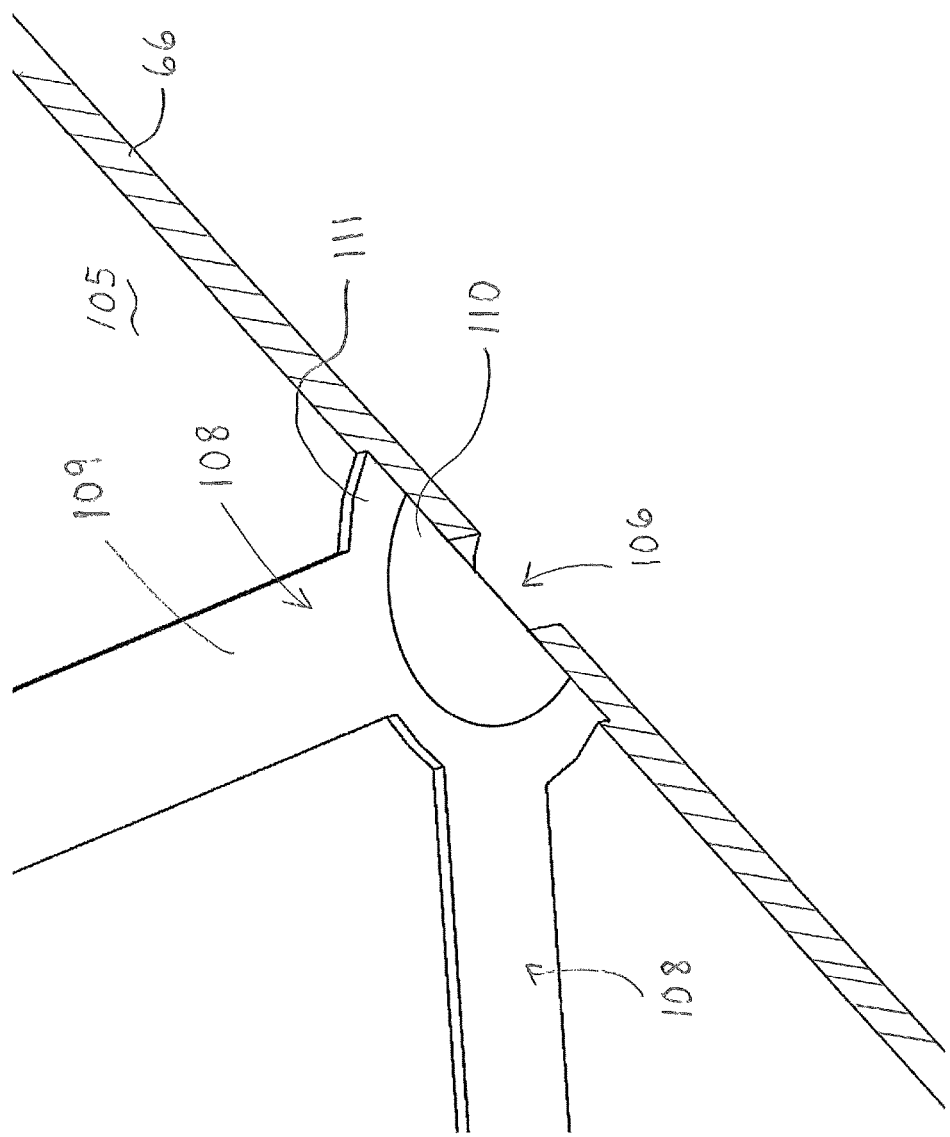

US 10,207,764 B2

BATTERY SAFETY ENCLOSURE

CROSS REFERENCE TO RELATED APPLICATIONS

This application claims the benefit of U.S. Provisional Application No. 62/278,687, filed Jan. 14, 2016, and is a Continuation-in-Part of U.S. application Ser. No. 15/347,023, filed Nov. 9, 2016, the disclosures of which are hereby incorporated by reference.

BACKGROUND OF THE INVENTION

This present disclosure relates to riding toys, namely two-wheeled scooters, designed for a single person to stand on and control by moving the position and angle of their feet. Other devices exist in the art, such as the well-known Segway® transporter, various aspects being covered in many U.S. Patents. These require a steering bar or other member that the user rotates or twists to accomplish the steering. The forward and reverse direction is caused by the user shifting their weight. Another example is by Shane Chen, U.S. Pat. No. 8,738,278, covering a personal transporter with independently moveable foot placement sections. The Chen patent removes the steering bar and relies on the user tilting the independently moveable foot placement sections to move forward, backward, and steer.

The prior art has still-unresolved issues, such as the inherent instability of independently moveable foot placement sections. By allowing them to be fully independent, sudden directional changes are possible. The device can begin dangerous oscillations, particularly when the user is mounting or dismounting. The Chen patent discloses that each independent foot placement section controls a respective motor. The independent nature frequently causes an inexperienced rider to lose balance and fall, causing injuries and other harm.

This present disclosure relates to enclosures for containing and restricting the release of noxious or flammable gas from a failing battery or battery pack. Lithium batteries, when damaged, defective, mistreated, or otherwise compromised, can release flammable gas or other hazardous by-products that can be toxic or self-ignite, creating property damage and personal injury. Other battery safety enclosures attempt to address this issue, but fall short due to overly complex designs or inadequate protection. An improved enclosure is needed.

SUMMARY OF THE INVENTION

The present disclosure describes a scooter, personal recreational toy, or fun travel device that is for a single user to ride, and by shifting their weight or changing the angle of their feet, can cause the device to steer, accelerate, decelerate, and perform various tricks. The device improves on the Chen patent by including a center section that couples the two halves. The left and right sections are tied together through a spider gear held in the center, allowing controlled movement between the left and right sections. By controlling the movement between the left and right sections, stability is increased, allowing for increased comfort and safety, particularly for the novice. Optionally, a return-to-center feature can be implemented using a spring, magnet, or other means to further stabilize the scooter and provide an easier learning curve for the beginner.

The present disclosure also relates to a synchronous movement scooter which includes a left side, a right side, and a rotating mechanism located between and coupled to both left and right sides. The rotating mechanism is meshed with a gear portion of the left side and a gear portion of the right side respectively through a drive gear. When a user angles the left side or the right side to turn over, the right side or the left side is automatically driven by the drive gear to turn over reversely, thus the synchronous movement scooter is controlled to turn left or right; moreover, the radius of rotation of the synchronous movement scooter is smaller so that it is easy for the user to operate and control the synchronous movement scooter, and hazards occurred during operating and controlling is prevented.

The movement principle of a synchronous movement scooter is mainly established on a fundamental principle called "dynamic stabilization (Dynamic Stabilization)", i.e., the automatic balancing ability of the scooter itself. After the posture state of a side is judged using built-in precise solid-state gyroscopes (Solid-State Gyroscopes), and a proper instruction is calculated out using a precise and high speed CPU, a motor is driven to achieve a balancing effect.

Generally, the synchronous movement scooter may be operated and controlled to swerve by angling the left and right sides or changing center of gravity; however, the radius of rotation of the synchronous movement scooter is too large, which is inconvenient to swerve in narrow space. Furthermore, the synchronous movement scooter may rotate in place by angling the left and right sides at the same time and making them turn over towards different directions; however, this operation and control manner requires a user to have excellent coordination, and it is generally easier for a beginner to grasp.

In order to solve the foregoing technical problems, the present disclosure discloses a synchronous movement scooter, characterized by including a left side, a right side, a rotating mechanism, two sensing devices and controllers, wherein the rotating mechanism comprises a connecting shaft, a left shaft sleeve, a right shaft sleeve and a drive gear, the left shaft sleeve and the right shaft sleeve are arranged in a left connecting portion of the left side and a right connecting portion of the right side respectively, the left end and the right end of the connecting shaft are sheathed in the left shaft sleeve and the right shaft sleeve respectively, the drive gear is pivoted in the connecting shaft and located between the left connecting portion and the right connecting portion, and is meshed with a left gear portion of the left connecting portion and a right gear portion of the right connecting portion; the two sensing devices are arranged in the left side and in the right side respectively; and the controllers are arranged in the left side and in the right side, and are connected to the sensing devices, a left drive motor of the left side and a right drive motor of the right side; wherein, the left side or the right side turns over, the left gear portion or the right gear portion drives the drive gear, and the drive gear drives the right gear portion or the left gear portion, so as to automatically drive the right side or the left side to turn over.

The left side further comprises a left shell, a left body, a left pedestal and a left wheel body, the left shell and the left pedestal are arranged above and below the left body respectively, the left wheel body is pivoted in a left pivot joint between the left body and the left pedestal and comprises a left tire and the left drive motor arranged on the center of the left tire; the right body further comprises a right shell, a right body, a right pedestal and a right wheel body, the right body and the right pedestal are arranged above and below the right body respectively, the right wheel body is pivoted in a right pivot joint between the right body and the right pedestal and comprises a right tire and the right drive motor arranged on the center of the right tire; and the left connecting portion and the right connecting portion are located at one side of the left body and the right body respectively, the left connecting portion is opposite to the right connecting portion, the left gear portion and the right gear portion are located at the upper ends of the left connecting portion and the right connecting portion respectively.

The two sensing devices optionally include a support mount and two angle and accelerometer gyroscopes respectively, the two support mounts are arranged in the left pedestal and the right pedestal respectively, and the two gyroscopes of each of the sensing devices are arranged at the two supporting ends of the support. The controller further includes a control circuit board and a power supply unit.

The two sensing devices can include an infrared sensor or a piezoelectric sensor respectively, the two infrared sensors or piezoelectric sensors are arranged in the left shell of the left side and the right shell of the right side respectively, the front sides of the left side and the right side are provided with an indicator lamp respectively, and the two infrared sensors or piezoelectric sensors and the two indicator lamps are connected to the control circuit board.

The left shell and the right shell are further extended and arranged on a left wheel cover and a right fender respectively, the left fender and the right fender are arranged above the left wheel and the right wheel; and the upper surfaces of the left shell and the right shell are further provided with an antiskid pedal respectively, and the two antiskid pedals are provided with a plurality of antiskid strips respectively.

The scooter may include anti-collision sensors, the anti-collision sensors may be arranged at the front sides and the rear sides of the left pedestal and the right pedestal respectively, and the anti-collision sensors are connected to the control circuit board. The controller further includes a charging port and a power switch, the charging port and the power switch are connected to the control circuit board.

Compared with the prior art, the present disclosure may acquire the following technical effects. The left and right scooter sides are automatically driven by the rotating mechanism to turn over relatively, so that the synchronous movement scooter is driven to rotate in a small radius of rotation; the insides of the left and right scooter bodies are provided with the sensing device respectively, and each of the sensing device senses the change of the gravity center of the corresponding side, and controls the rolling directions and speeds of the left and right wheel bodies; the left and right scooter bodies are provided with the infrared sensor or the piezoelectric sensor and the trample indicator lamp respectively, so that the object of identifying whether a user steps on the device, synchronous movement scooter is achieved; the left and right scooter bodies are provided with the antiskid pedal respectively, which prevents the user from slipping and falling over the scooter; and the left and right scooter bodies may optionally contain anti-collision sensors respectively to sense the distance between the synchronous movement scooter and an obstacle; when the distance is less than a safe distance, the synchronous movement scooter may slow down or stop moving, which prevents the scooter from colliding with the obstacle.

An optional aspect of the invention involves a handle that protrudes upwardly from the center section to assist the user for stability. The angle of the handle is determined by the average angle of both sides, such that when one side is angled forward and the other side is angled backward, the angle of the handle does not change.

The present disclosure describes a two-piece safety enclosure with a metered release port. The enclosure is designed to be attached to another separate component, where it overlays a flat or mostly flat surface. The enclosure also offers a separate egress for wires and is designed to be sealed to prevent or restrict gas transfer from the inside to the outside of the enclosure. The enclosure contains a series of individual batteries or cells that make up a battery pack. The enclosure may also contain optional charging circuitry, and a convoluted internal path for gas to escape. The port is covered by a material or valve that safely releases any excessive gas pressure. When attached to the other component, the port and valve is obscured but not blocked. The port and channels cooperate with the flat surface on the separate component to form a tunnel or series of tunnels that disperse any vented gases. Internal or external reinforcements may be added to strengthen the enclosure for the elevated pressure that may be present in the event a battery or several batteries fail.

BRIEF DESCRIPTION OF THE DRAWINGS

A preferred embodiment of this invention has been chosen wherein:

FIG. 21 is a partial section view 21-21 showing only the upper shell of the battery enclosure of FIG. 14.

DESCRIPTION OF THE PREFERRED EMBODIMENT

Figure 1:
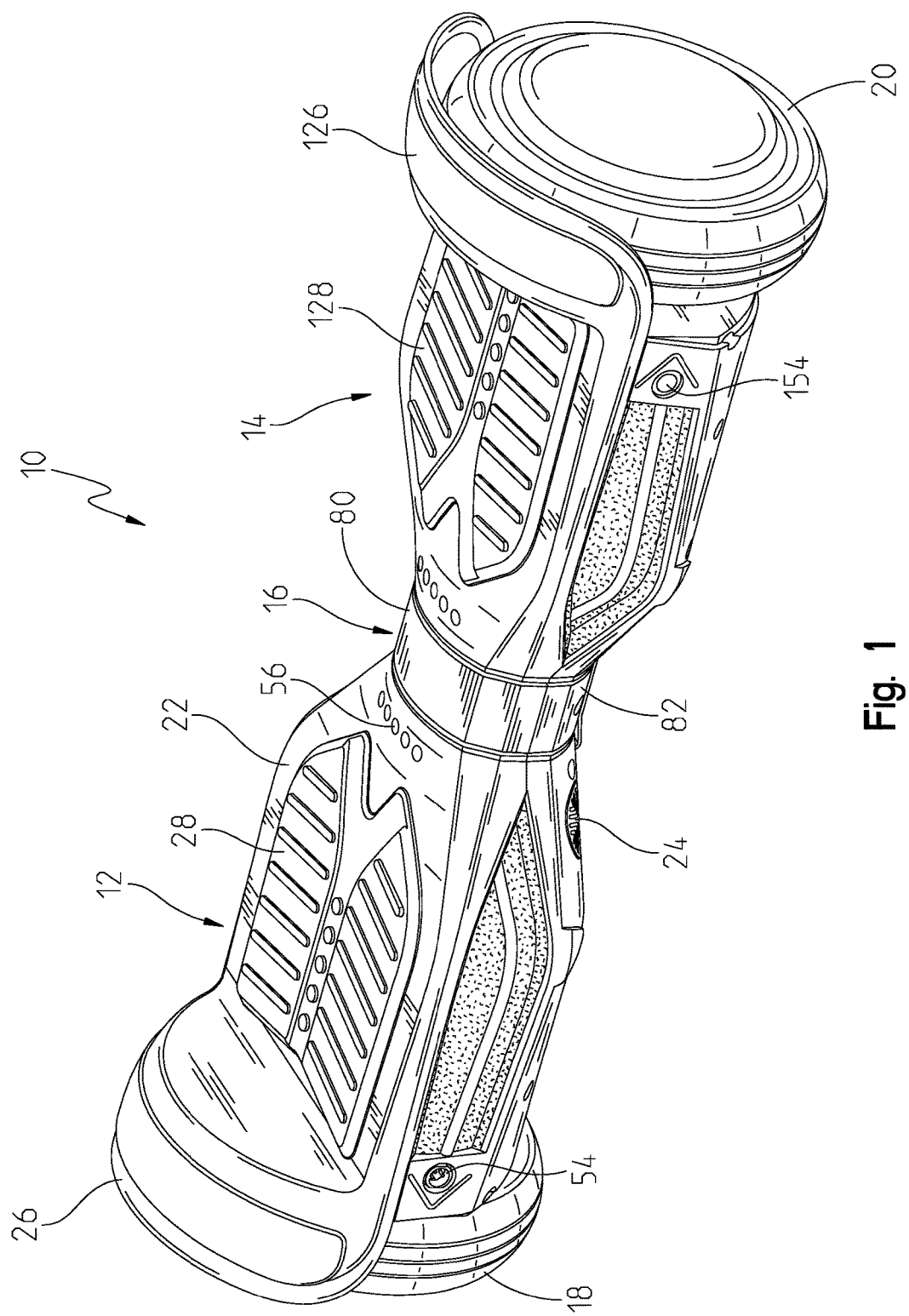
FIG. 1 is a top isometric view of the device.
Figure 2:
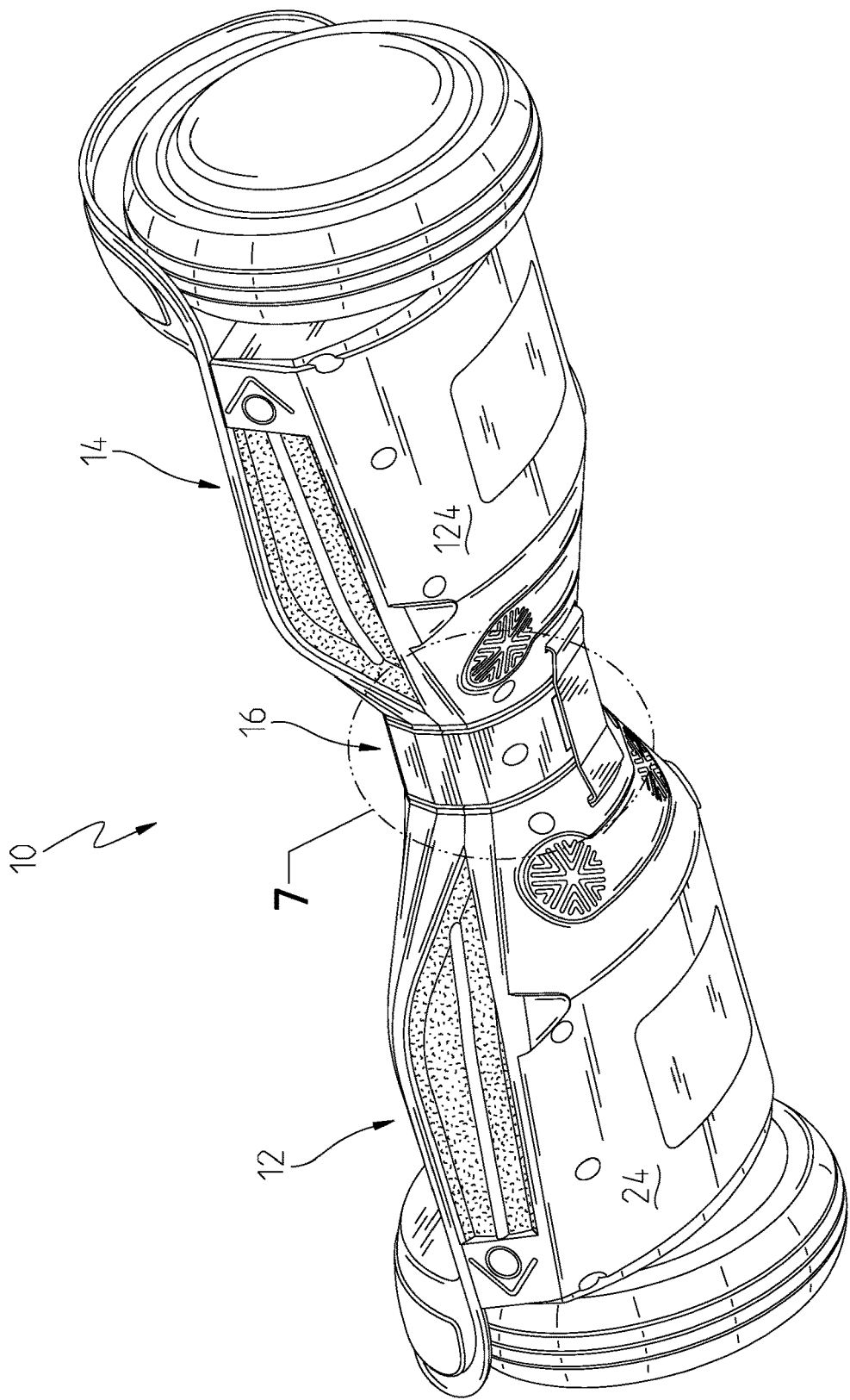
FIG. 2 is a bottom isometric view of the device.
Figure 3:
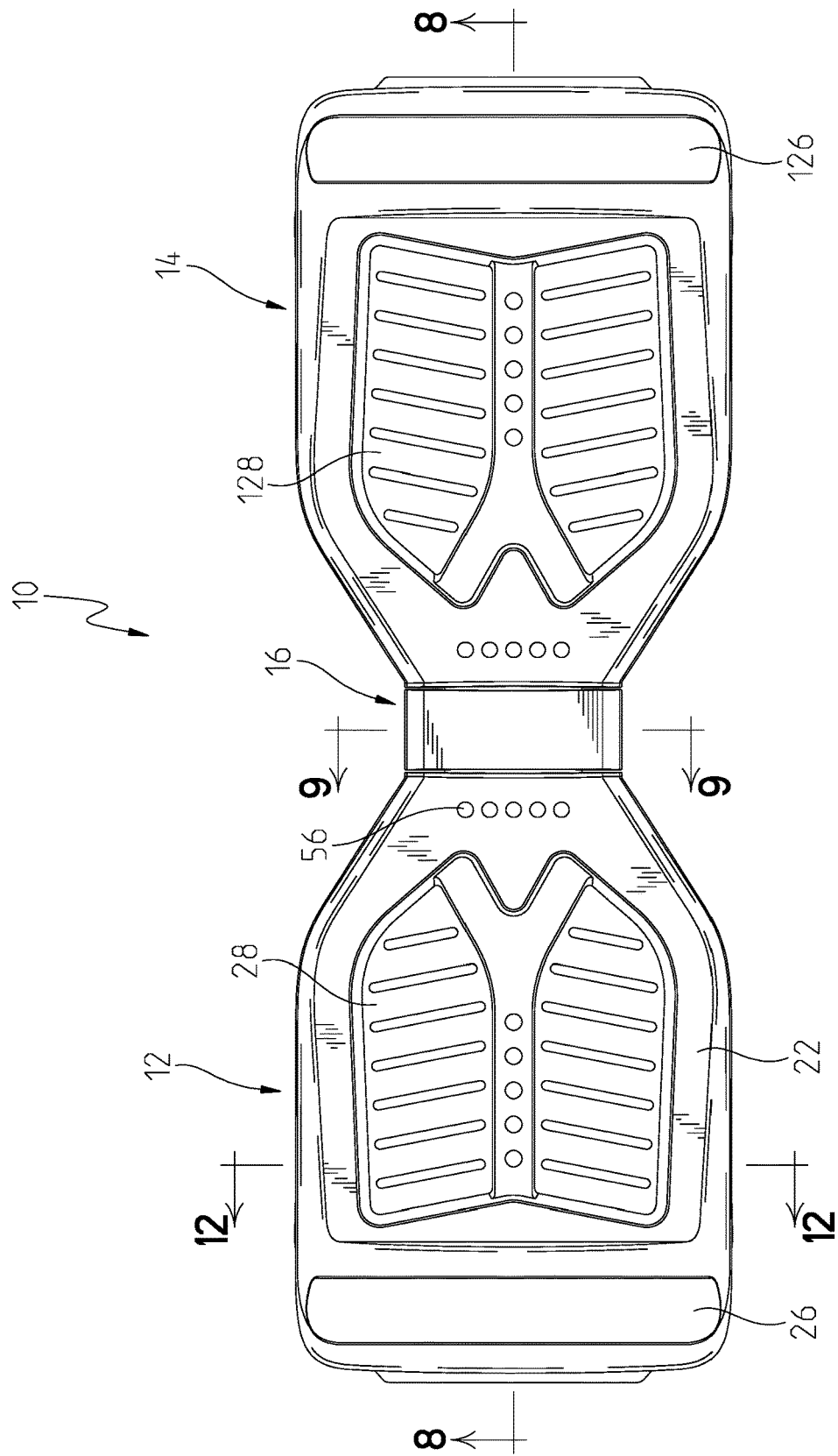
FIG. 3 is a top view of the device.
Figure 4:
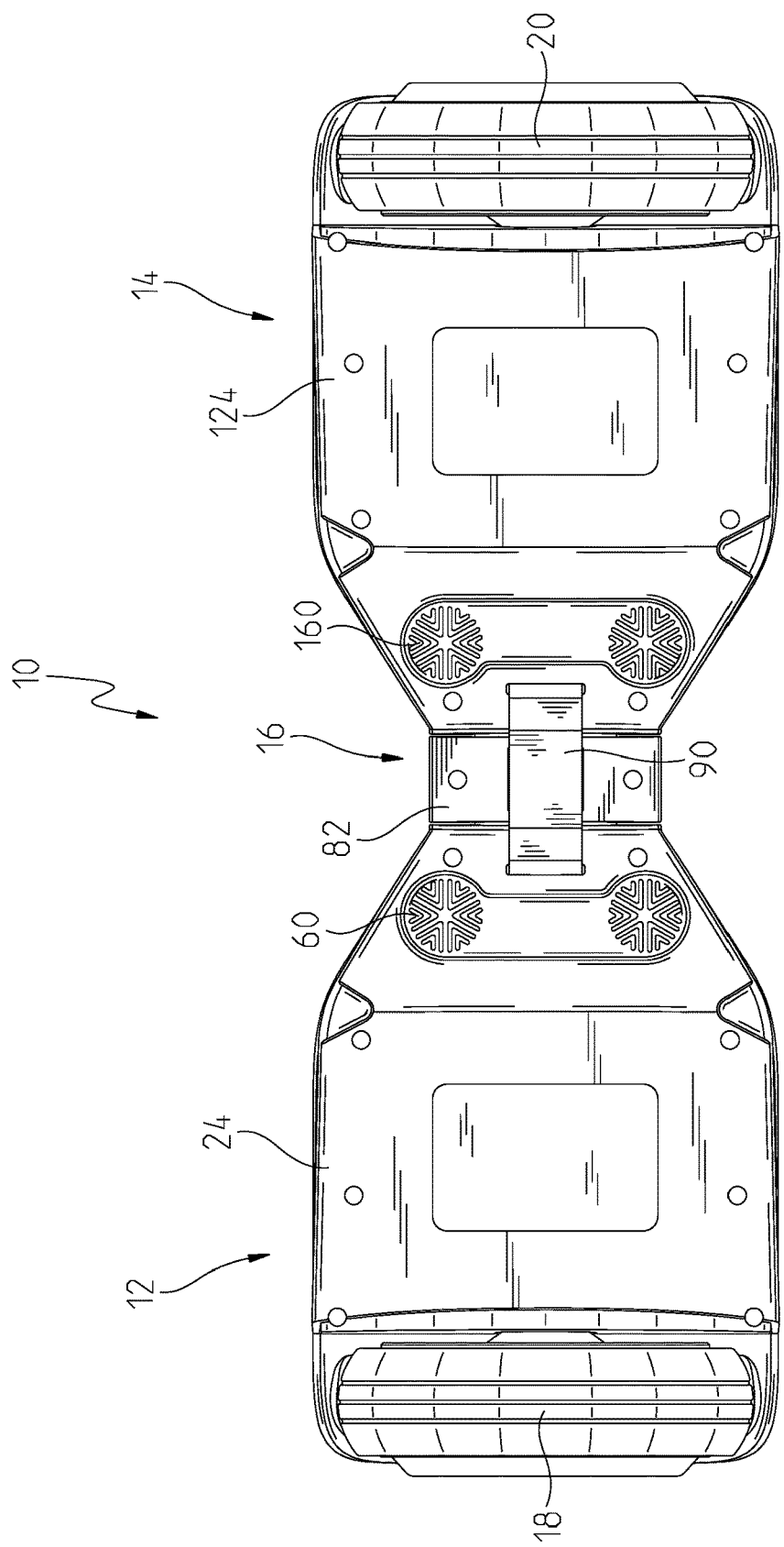
FIG. 4 is a bottom view of the device.
Figure 5:
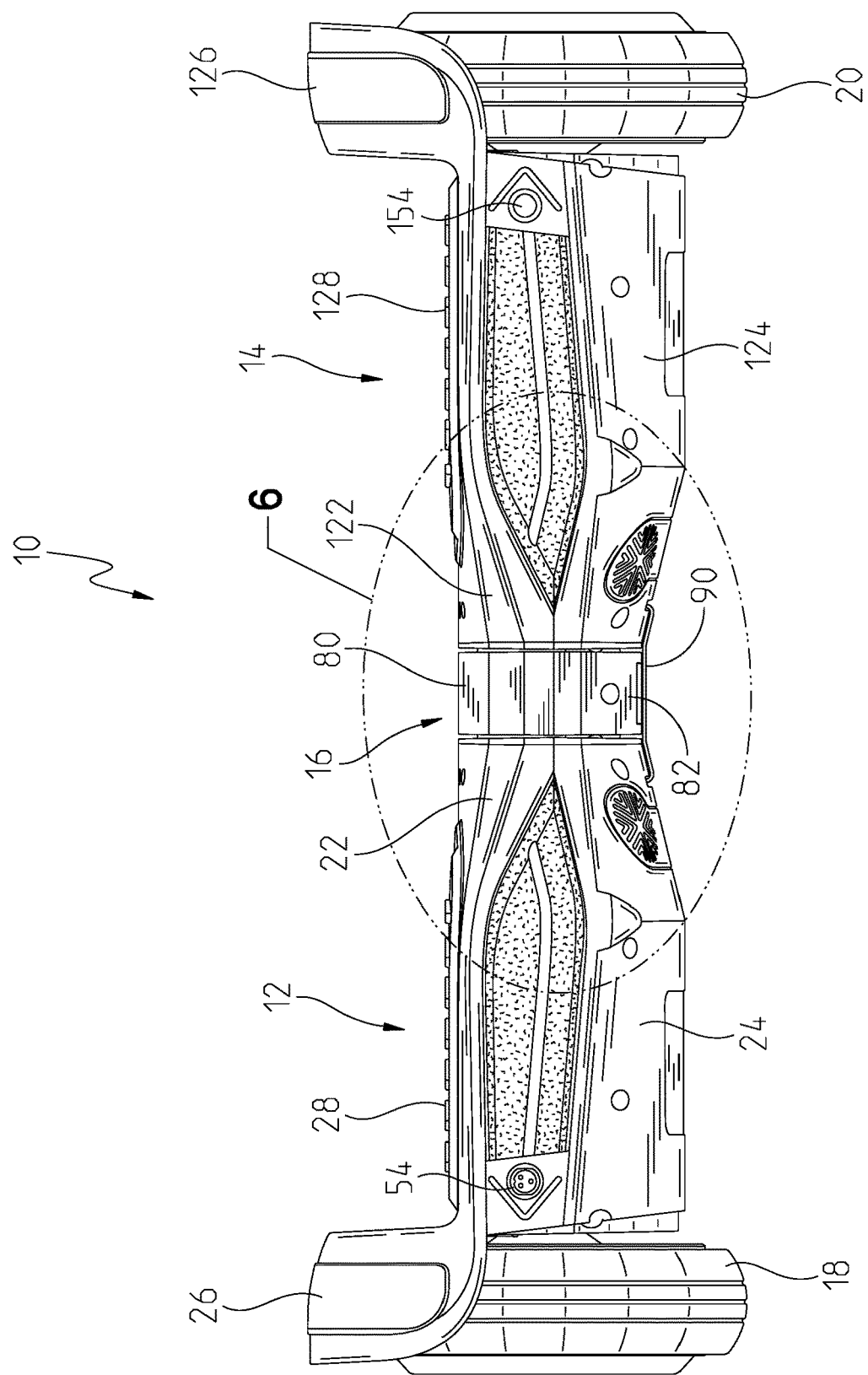
FIG. 5 is a rear view of the device.

A scooter 10 is shown in FIGS. 1-5 and has three primary portions. The portions include a left side 12, a right side, 14, and a center section 16. The left side 12 has a left wheel 18 and the right side 14 has a right wheel 20. Both are adapted to roll on the ground or other horizontal surface.

Figure 6:
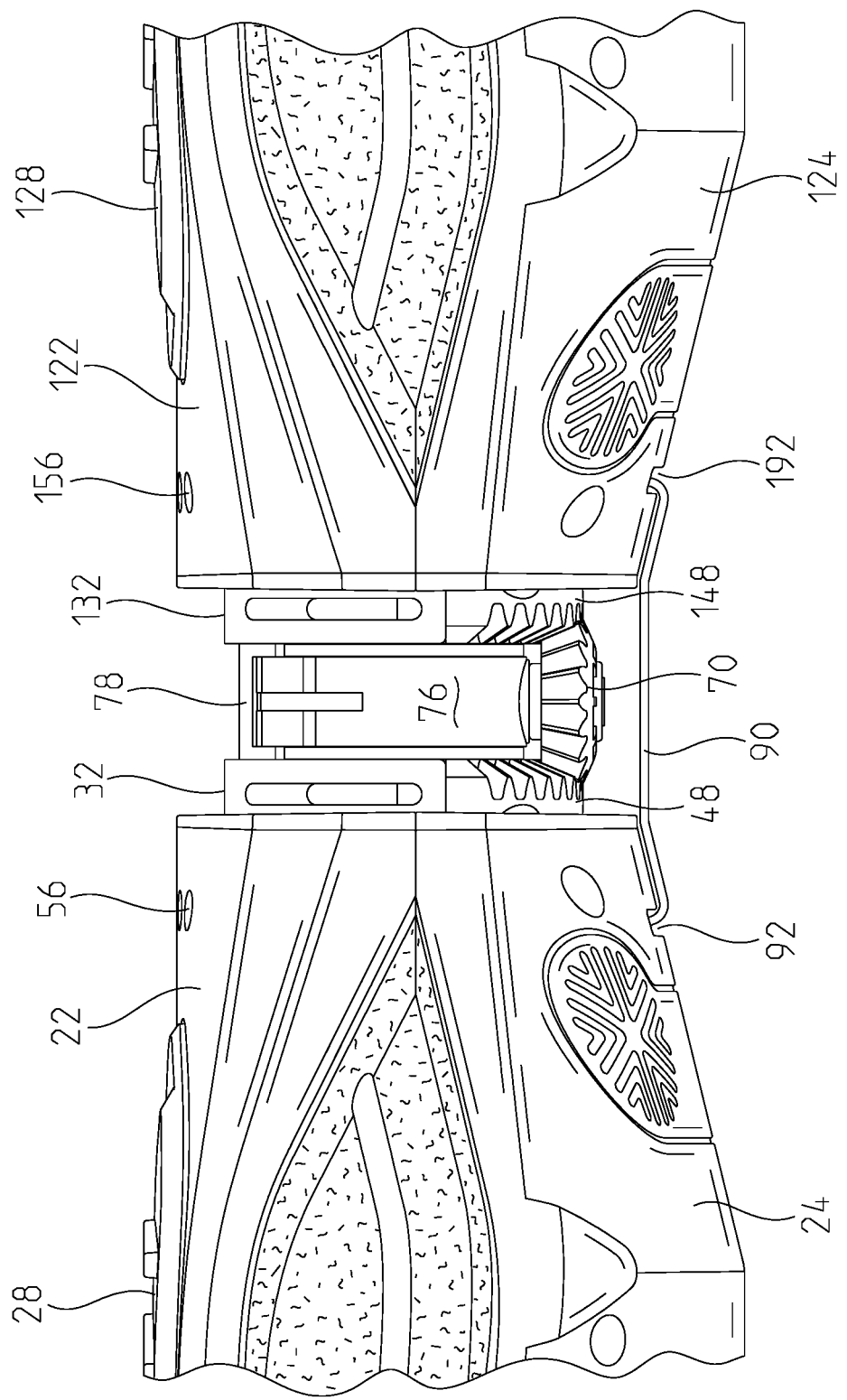
FIG. 6 is a partial section view of the device in FIG. 5.
Figure 8:
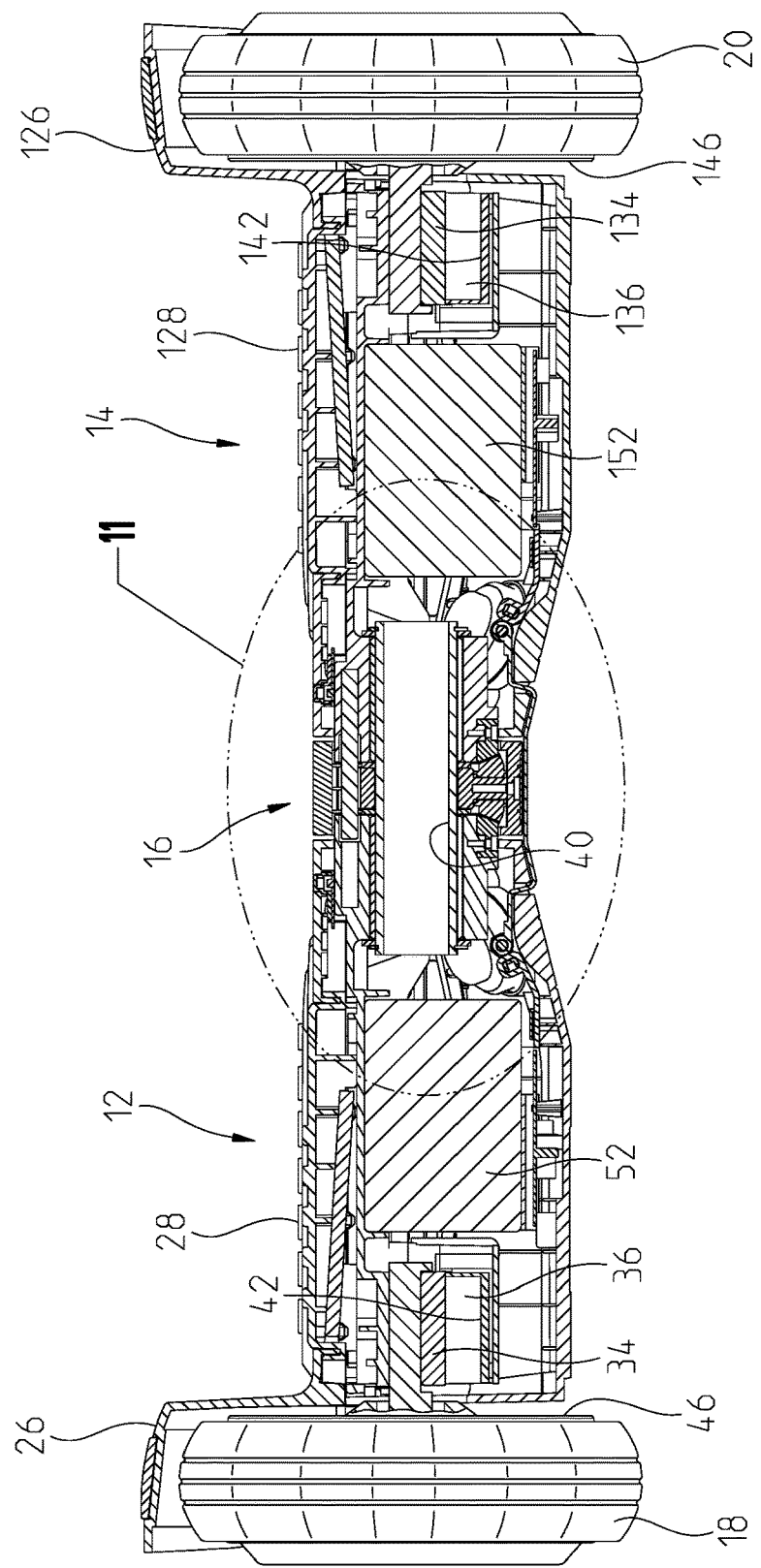
FIG. 8 is a section view 8-8 of the device in FIG. 3.
Figure 9:
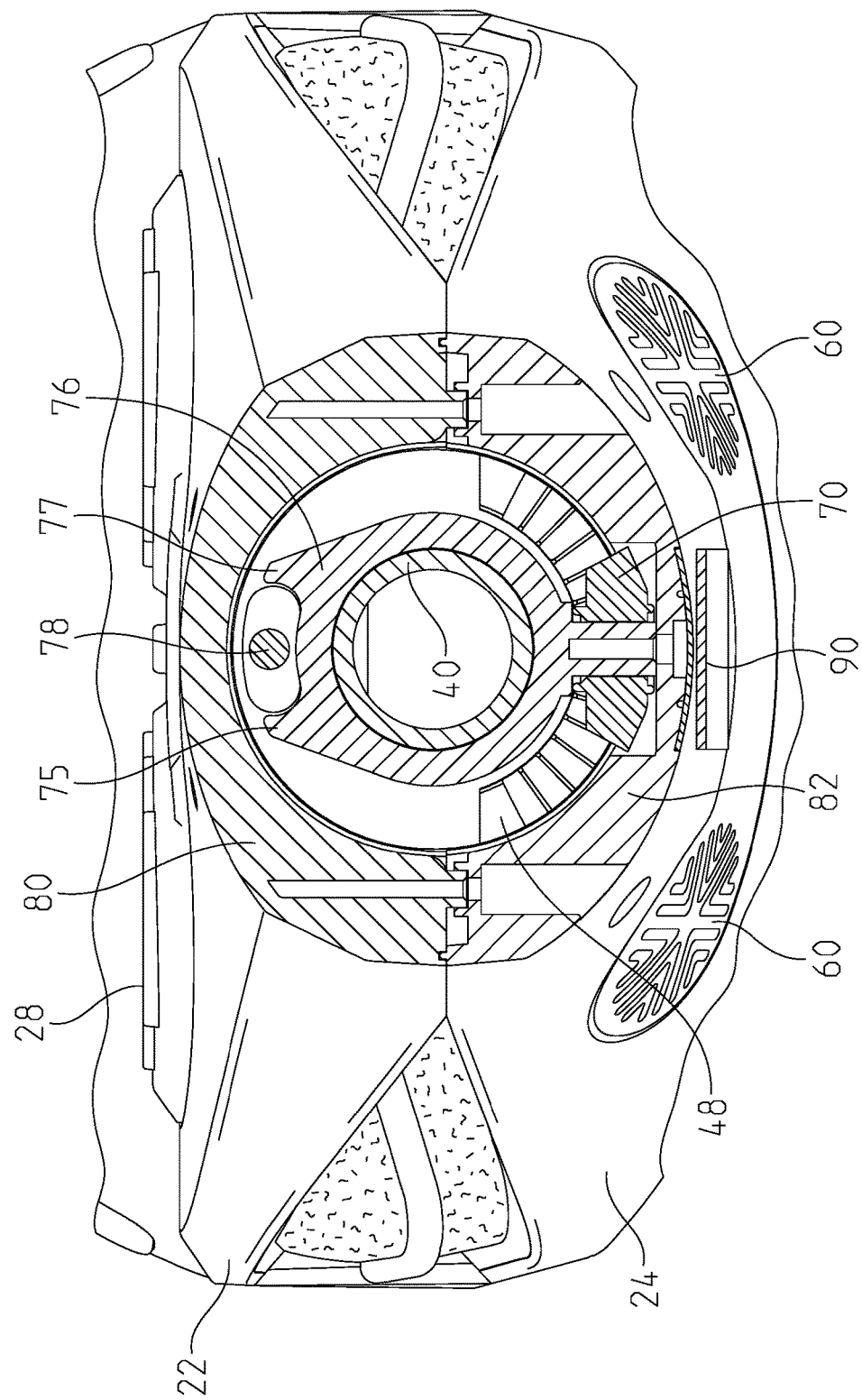
FIG. 9 is a section view 9-9 of the device in FIG. 3.
Figure 10:
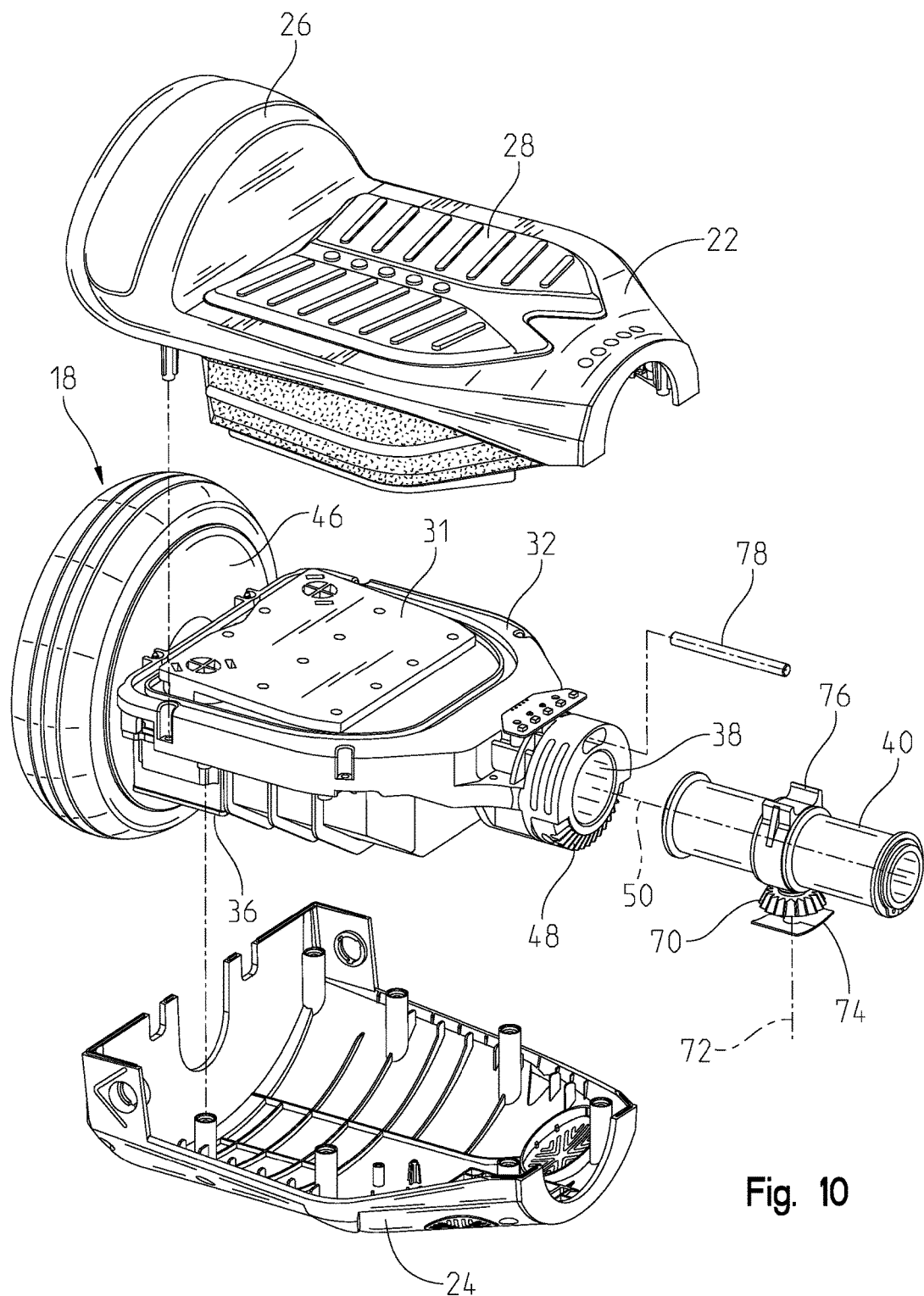
FIG. 10 is an exploded view of the left side and center section of the device in FIG. 1.
Figure 12:
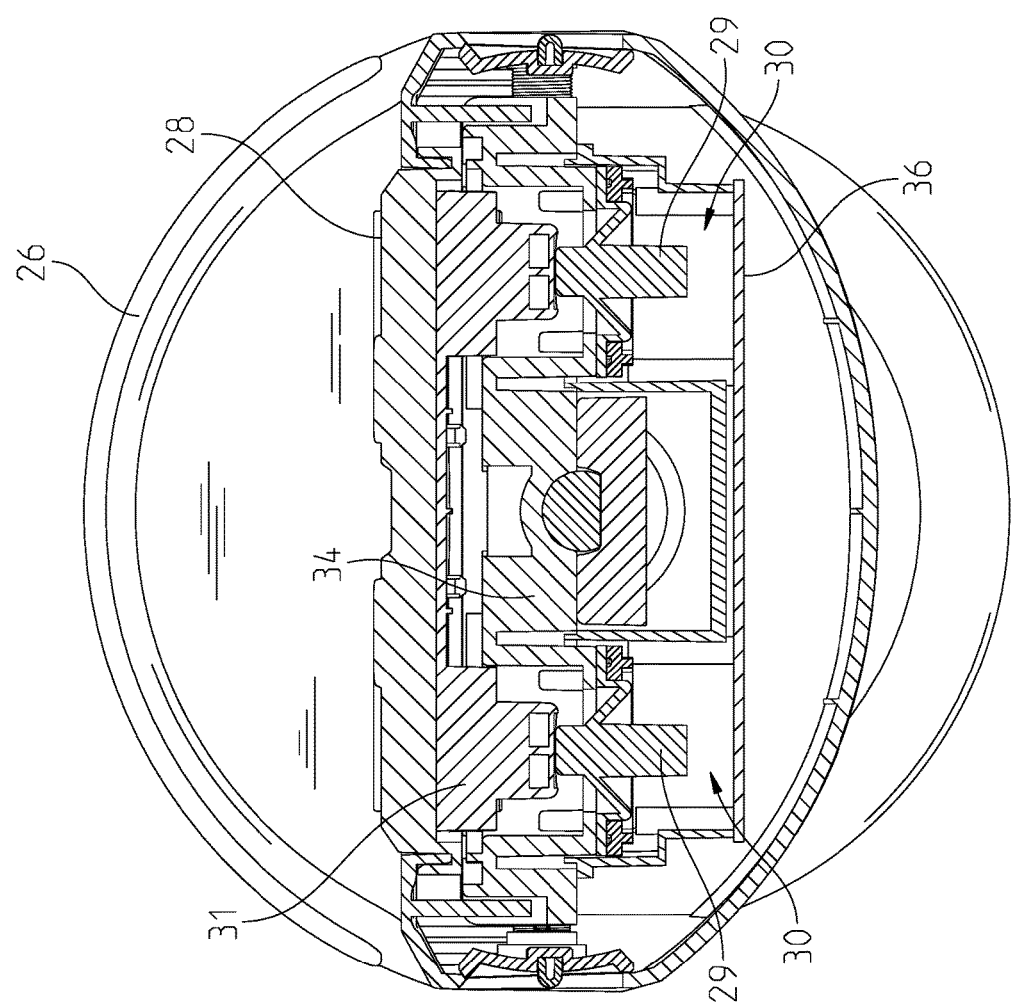
FIG. 12 is a section view 12-12 of the device as shown in FIG. 3.

Turning now to the detail of the left side 12, an upper housing 22 and a lower housing 24 form a protective and decorative cover for internal components and electrical connections, shown in FIGS. 6, 8, 10. As shown in FIG. 8, the left wheel 18 is attached on one side and is covered by a fender portion 26 of the upper housing 22. The left side 12, specifically the upper housing 22, further includes an anti-slip foot pad 28 that is made for the user to place their weight or stand on. The foot pad 28 may also contain a presence sensor 30 to detect the rider's presence. Directly underneath the foot pad 28 is a structure 31 that has downwardly extending protrusions 29 that change the state of the presence sensor 30. This is shown in FIG. 12. It is contemplated that the sensor 30 is contained elsewhere in the left side 12. The sensor 30 can change between a state where the rider is present and a state where the rider is present and applying weight to a portion of the left side 12. The sensor 30 can be as simple as a spring-return momentary switch or have other sensing technology such as load cells, non-contacting proximity, or further sensing technology not described herein. As shown in the exploded view in FIG. 10, between the upper housing 22 and lower housing 24 are several components. A frame 32 provides structural support for the housings 22, 24 and has several mounting points. The left wheel 18 is attached on a wheel attachment portion 34. The frame 32 also has mounting locations for a control board 36. The frame 32 further has a receiver 38 for a central shaft 40, shown in FIG. 10. As shown in FIG. 12, the control board 36 has the presence sensor 30. The foot pad 28 or structure 31 has the protrusions 29 that extend down and away from its upper surface to contact the presence sensor 30. Adjacent the receiver 38 is a gear portion 48, shown in FIG. 9. The gear portion 48, also referred to as a sector gear, shares a center point that is intersected by a receiver axis 50, shown in FIG. 10. The gear portion 48 is a portion of an entire gear, and it is contemplated that the gear portion is a complete gear. As shown, the gear portion 48 is affixed to the frame 32, but it is contemplated that the gear portion 48 is integral to the frame 32 or housings 22, 24.

The control board 36 further includes a level sensor 42 that detects the angle of the left side 12 with respect to the earth's gravity. The level sensor 42 reports the angle as a variable amount of tilt of the left side 12. The reported angle is the amount of forward and reverse tilt, with a neutral point between the transition between forward and reverse tilt. The neutral point is located where the left side 12, particularly the foot pad 28, is substantially parallel with the horizon. The control board 36 receives signals from the level sensor 42 and presence sensor 30 to determine the speed and direction for a motor 46 that is connected to the left wheel 18. As shown, the motor 46 is a brushless DC motor that has position sensor feedback and a series of coils (sensor and coils not shown). The sensor feedback in the motor 46 allows the control board 36 to appropriately enable the series of coils to drive the left wheel 18. Electric commutation of brushless DC (BLDC) motors is well known in the art. While the motor 46 described herein is a BLDC motor, it is contemplated that other types of motors could be used, such as a brushed DC, induction, or other type not disclosed herein.

The level sensor 42 can be a MEMS or other vibrating structure gyroscope sensor, commonly used in smartphones, portable gaming devices, and other electronic devices that sense angles. The level sensor 42 measures the angle of the left side 12 with respect to earth's gravity. Further, because the angle reported by gyroscopes can be influenced by dynamics, such as acceleration, vibration, and elevation changes, it is contemplated to further include an accelerometer in addition to the level sensor 42. Gyroscopes and comparable level sensors are well-known in the art. The data generated by the accelerometer can be combined with the data generated by the gyroscope to generate an angle that is much more accurate than one of those measuring devices alone. It is contemplated that the level sensor is another type that is not specifically described but functions to determine the angle of the left side 12 to the earth's gravity. It is further contemplated that the level sensor 42 is mounted elsewhere on the left side 12, while still detecting its angle. For example, the level sensor 42 detects the angle of the left side 12, typically the foot pad 28, such that when the left side 12 is at a slight angle in one direction, the control board 36 commands the motor 46 to rotate (and left wheel 18) in a first direction. If the angle of left side 12 increases, the control board 36 would increase the speed of the motor 46. If the left side 12 is tipped in the opposite direction, the control board 36 would reverse the direction of the motor 46. If the left side 12 is substantially level and the level sensor 42 is located at the neutral point, the control board 36 would stop the motor 46 from rotating. It is contemplated that the control board 36 includes other features, such as remote monitoring capabilities, Bluetooth accessories, speakers 60, and lighting. For example, lights 56 can provide important status of the device 10, such as battery life, charge status, or simply provide decorative illumination. It is further contemplated that the previously described other features are affixed to the housings 22, 24 or frame 32. The lights 56, 156 can be used to indicate battery charge by changing color or illuminating different segments.

The right side 14 is nearly identical and symmetrical to the left side 12 but will be described for clarity. The right side 14, an upper housing 122 and a lower housing 124 form a protective and decorative cover for internal components and electrical connections. The right wheel 20 is attached on one side and is covered by a fender portion 126 of the upper housing 122. The right side 14, specifically the upper housing 122, further includes an anti-slip foot pad 128 that is made for the user to place their weight or stand on. The foot pad 128 may also contain a presence sensor 130 to detect the rider's presence. It is contemplated that the sensor 130 is contained elsewhere in the right side 14. The sensor 130 can change between a state where the rider is not present and a state where the rider is present and applying weight to a portion of the right side 14. The sensor 130 can be as simple as a spring-return momentary switch or have other sensing technology such as load cells, non-contacting proximity, or further sensing technology not described herein. A frame 132 provides structural support for the housings 122, 124 and has several mounting points. The right wheel 20 is attached on a wheel attachment portion 134. The frame 132 also has mounting locations for a control board 136. As with the frame 32, frame 132 further has a receiver for a central shaft 40. As shown, the control board 136 has the sensor 130. The foot pad 128 has protrusions identical to protrusions 29 that extend down and away from its upper surface to contact the sensor 130. Adjacent the receiver is a gear portion 148. The gear portion 148, also referred to as a sector gear, shares a center point that is intersected by a receiver axis 50. The gear portion 148 is a portion of an entire gear, and it is contemplated that the gear portion is a complete gear. As shown, the gear portion 148 is affixed to the frame 132, but it is contemplated that the gear portion 148 is integral to the frame 132 or housings 122, 124.

The control board 136 further includes a level sensor 142 that detects the angle of the right side 14 with respect to earth's gravity. The level sensor 142 reports the angle as a variable amount of tilt of the right side 14. The reported angle is the amount of forward and reverse tilt, with a neutral point between the transition between forward and reverse tilt. The neutral point is located where the right side 14, particularly the foot pad 128, is substantially parallel with the horizon. The control board 136 receives signals from the level sensor 142 and presence sensor 130 to determine the speed and direction for a motor 146 that is connected to the right wheel 20. As shown, the motor 146 is a brushless DC motor that has position sensor feedback and a series of coils (sensor and coils not shown). The sensor feedback in the motor 146 allows the control board 136 to appropriately enable the series of coils to drive the right wheel 20. Electric commutation of brushless DC (BLDC) motors is well known in the art. While the motor 146 described herein is a BLDC motor, it is contemplated that other types of motors could be used, such as a brushed DC, induction, or other type not disclosed herein.

The level sensor 142 can be a MEMS or other vibrating structure gyroscope sensor, commonly used in smartphones, portable gaming devices, and other electronic devices that sense angles. The level sensor 142 measures the angle of the left side 12 with respect to earth's gravity. Further, because the angle reported by gyroscopes can be influenced by dynamics, such as acceleration, vibration, and elevation changes, it is contemplated to further include an accelerometer in addition to the level sensor 142. The data generated by the accelerometer can be combined with the data generated by the gyroscope to generate an angle that is much more accurate than one of those measuring devices alone. Gyroscopes and comparable level sensors are well-known in the art. It is contemplated that the level sensor is another type that is not specifically described but functions to determine the angle of the right side 14 to earth's gravity. It is further contemplated that the level sensor 142 is mounted elsewhere on the right side 14, while still detecting its angle. For example, the level sensor 142 detects the angle of the right side 14, typically the foot pad 128, such that when the right side 14 is at a slight angle in one direction, the control board 136 commands the motor 146 to rotate (and right wheel 20) in a first direction. If the angle of left side 12 increases, the control board 136 would increase the speed of the motor 146. If the right side 14 is tipped in the opposite direction, the control board 136 would reverse the direction of the motor 146. If the right side 14 is substantially level and the level sensor 142 is located at the neutral point, the control board 136 would stop the motor 146 from rotating. It is contemplated that the control board 136 includes other features, such as remote monitoring capabilities, Bluetooth accessories, speakers 160, and lighting. It is further contemplated that the scooter 10 has a single control board 36,136 in the left or right side 12, 14.

The left side 12 and right side 14 are powered by an onboard battery 52, 152, shown in FIG. 8. As shown, the battery 52,152 is located on both the left and right sides 12, 14, but it is contemplated that only one side holds a battery 52,152. The battery 52 will be discussed as the primary battery enclosed by enclosure 100. A charging port 54 allows an external power source to restore charge to the battery 52, 152 or batteries after the rider depletes them from use. The battery 52, 152 is optionally located inside a battery enclosure 100.

It is commonplace to integrate controls inside of one main control board, also referred to as a motherboard, that would contain the software and logic that would control each of the motors 46, 146 and receive sensor data from the various sensors. The control boards 36, 136, as well as a motherboard, would have software that interprets the tilt of its respective side 12,14 and provide power to the appropriate motor and appropriate direction to maintain balance or motion. The software typically resides in a microcontroller or microcontrollers where the inputs involve the rotational position, speed, and direction of the wheels 18, 20. Other inputs are the angles of the sides provided by the respective level sensors 42, 142, along with the state of the rider presence sensors 30, 130. Further, the battery charge level, charging status, and other inputs are contemplated. In some embodiments, the control boards 36, 136 would only contain the necessary sensors to detect the presence of the rider and the angle of the side 12, 14. The motherboard would contain a single microcontroller to handle the functions for both sides, and the sensors and motors would communicate with the motherboard. Another embodiment is contemplated where the onboard battery 52 is located in only one side, and the motherboard is located where the battery 152 is presently shown. The battery 52, 152 provides power to the control boards 36, 136.

Figure 7:
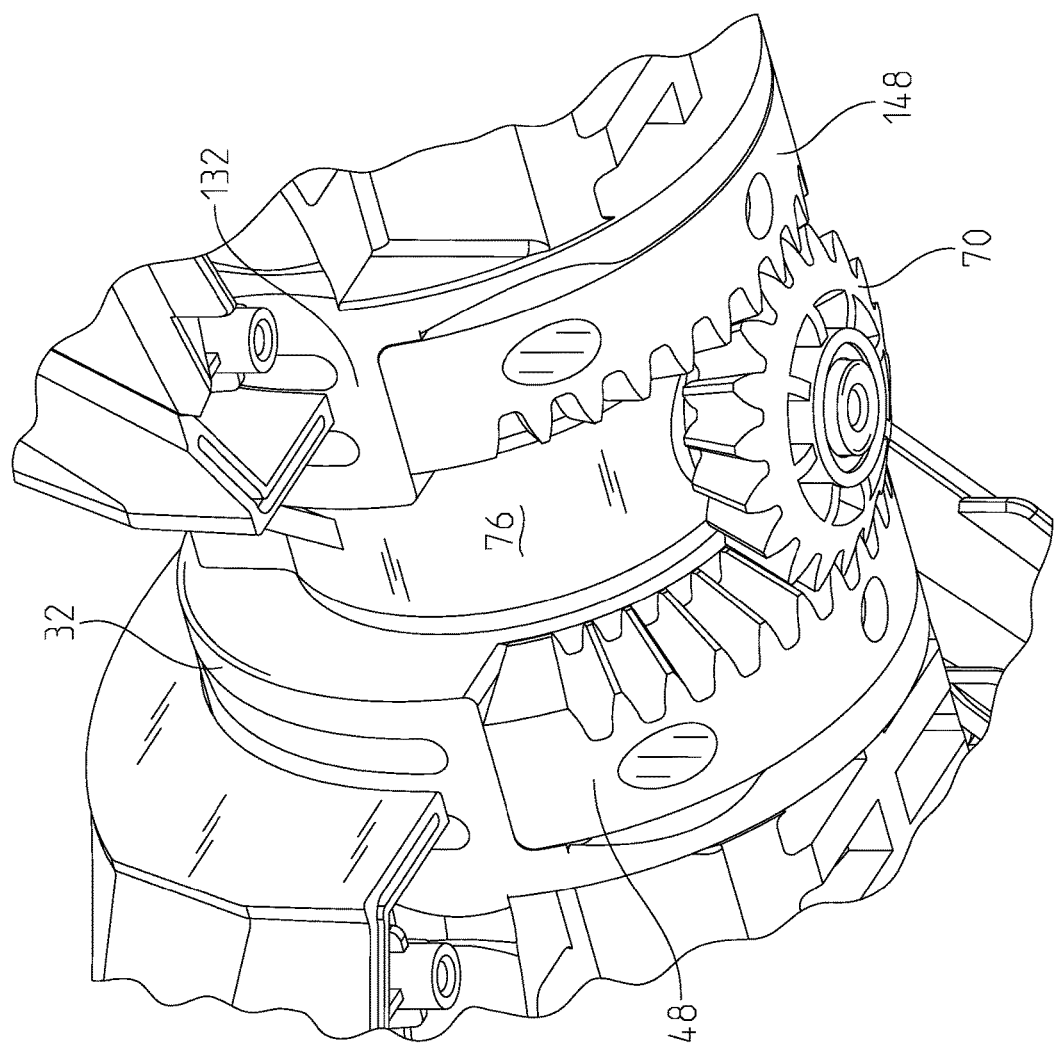
FIG. 7 is a partial bottom isometric view of the device in FIG. 2 showing the gear drive section and the lower covers removed.
Figure 11:
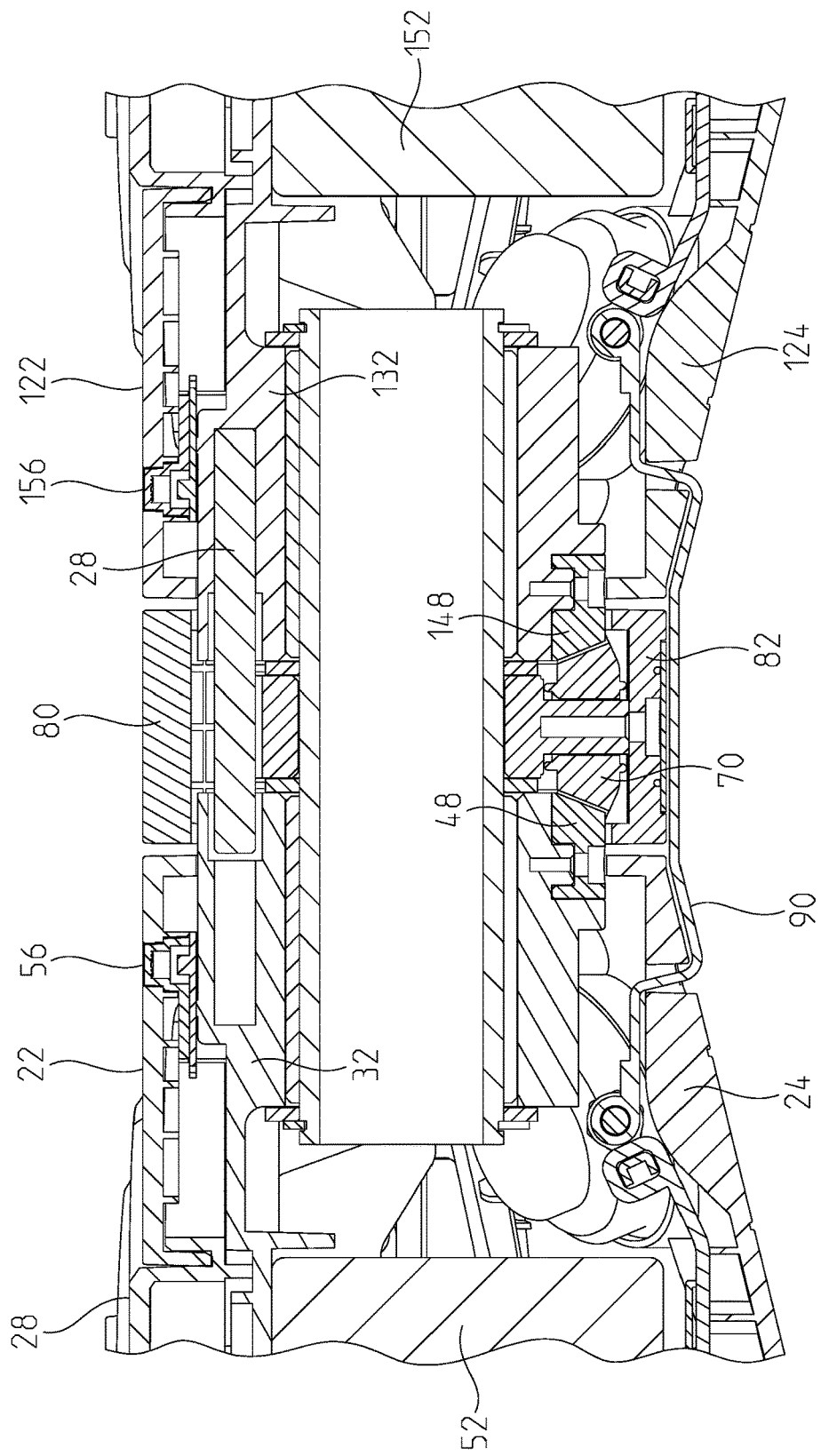
FIG. 11 is a partial view of the device in FIG. 8.

Rotatably connecting and located between the left side 12 and right side 14 is the center section 16, shown in FIG. 1. The center section 16 is located directly between the two, and serves to couple them. This is detailed in FIGS. 7, 9, and 11. A spider gear 70 meshes with gear portions 48, 148 to rotatably couple the left side 12 to the right side 14. The spider gear 70 rotates on a spider axis 72 and is held in by a fastener 74. The fastener 74 screws into a collar 76 that rides on the central shaft 40. The collar serves 76 to keep the spacing of the left side 12 and the right side 14 correct to maintain the proper meshing of the spider gear 70. As shown, the spider gear 70 rotates about an axis that extends outwardly and perpendicular to the receiver axis 50. The embodiment shows the spider gear 70 as a bevel gear, but other types of gears, such as worm, straight, hypoid, miter, helical, or spiral are contemplated.

A stop pin 78 engages the left side 12 and right side 14 to prevent excessive rotational movement of the left side 12 in relation to the right side 14. As shown in FIG. 9, the collar 76 has two upwardly protruding fingers 75, 77 that form a channel that the stop pin 78 passes through. A decorative top cover 80 and bottom cover 82 safely protect the user from getting fingers or other things pinched between the gears as they rotate. The covers 80, 82 also prevent objects from becoming entangled in the mechanism and creating issues with movement. It is contemplated that the covers 80, 82 contain other features, such as lights or external decoration that moves with the covers 80,82 or has external moving parts.

To control the scooter 10, first the user turns the power on with the power switch 154. If the batteries 52, 152 have sufficient charge, the control boards 36, 136 enable an indicator that the device is powered and any self-test passed. Next, the user puts a foot on one of the foot pads 28, 128, enabling the respective motor 46,146 and wheel 18, 20. The level sensor 42,142 reports the angle of the respective side 12, 14 to the control board 36,136 and moves the motor 46,146 one direction or the other, based on the angle. The user next puts the other foot on the other side 20, 18, tripping the other foot pad 128, 28 and enabling the other motor 46, 146 and wheel 20, 18. The other level sensor 142, 42 reports the angle of the other side 20, 18 and the control board 136,36 moves the other motor 146,46 and wheel 20, 18, based on the angle of the other side 20, 18.

Inside the control board 36, 136 or motherboard, a program runs that receives data from the level sensors 42, 142 and foot pads 28, 128 and, based on the angle and presence of the rider, will either rotate the respective wheel and motor in a forward or reverse direction based upon the angle of the respective side as calculated by the program. This program may include averaging function to filter out noise and allow more stability. The greater the angle of the level sensors 42, 142, the greater the torque or speed is applied to the motors 46,146 and wheels 18, 20. As speed increases, other factors may optionally be implemented by the control board 36, 136, such as a speed alarm or angular offset. If the scooter 10 is over a predetermined speed, an alarm may sound to indicate potentially dangerous condition to the user. Other options include a low battery alarm to indicate to the user that the scooter 10 needs to be recharged.

Figure 13:
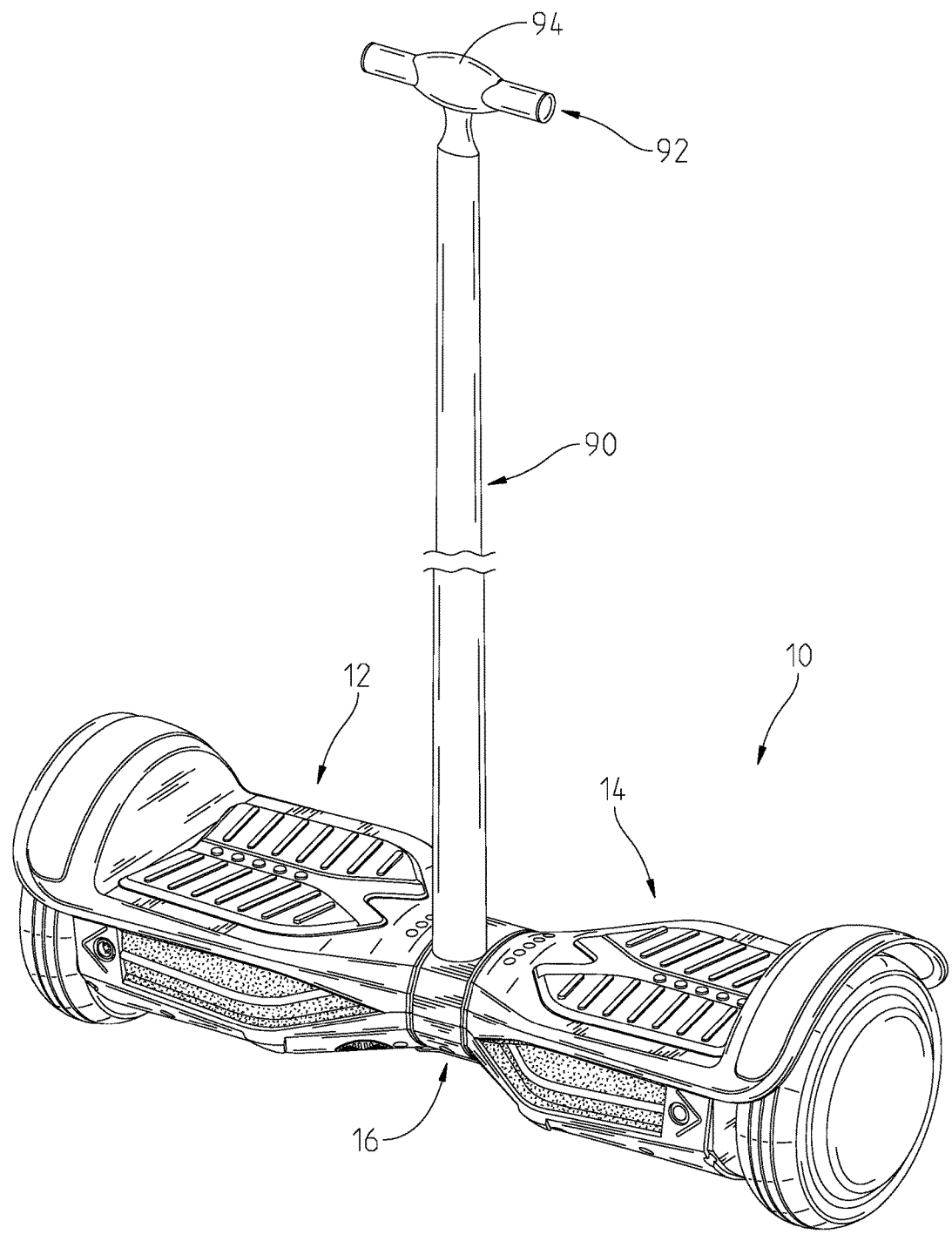
FIG. 13 is an isometric view of the device including a handle.
Figure 14:
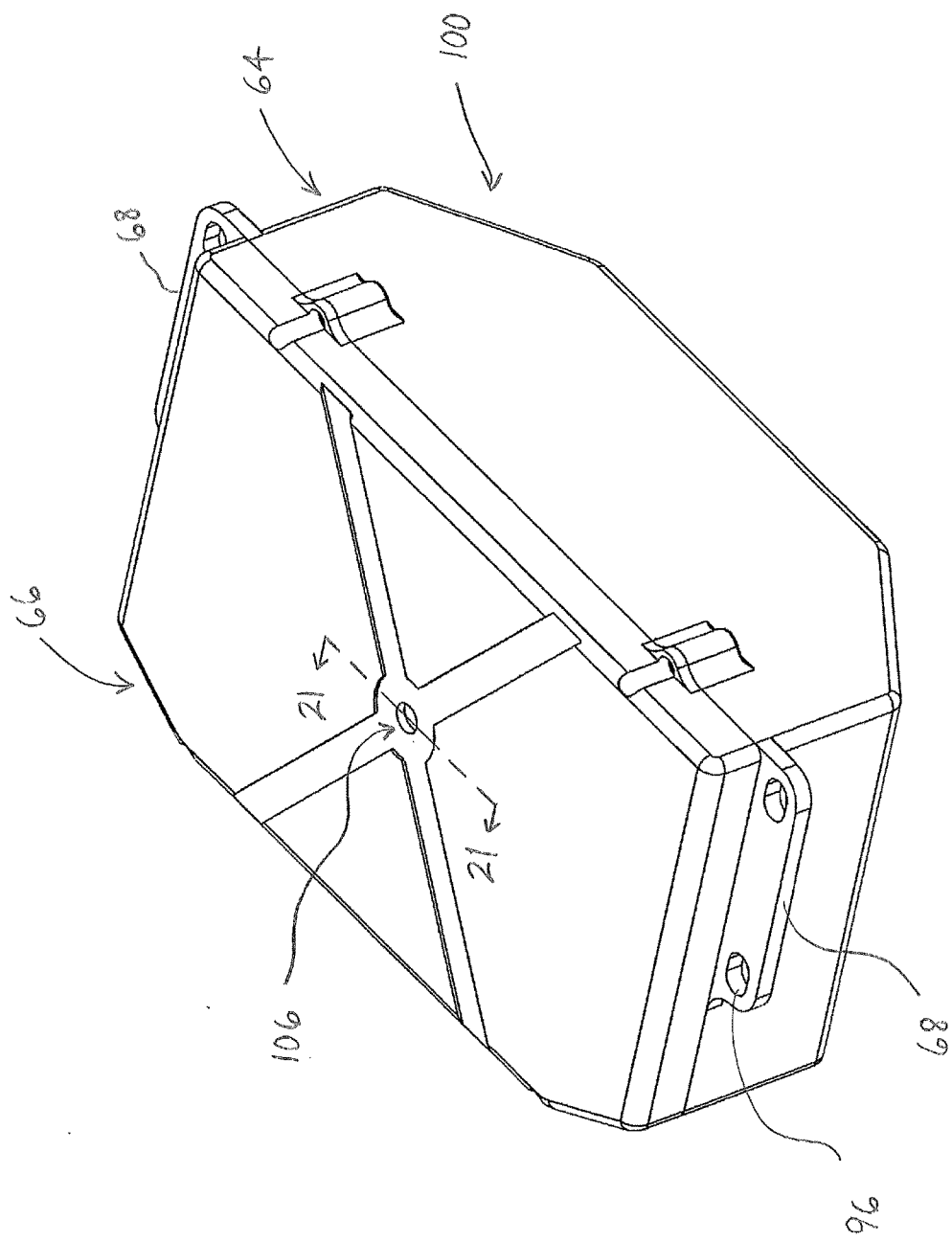
FIG. 14 is a top isometric view of the battery enclosure shown separately from the device.
Figure 15:
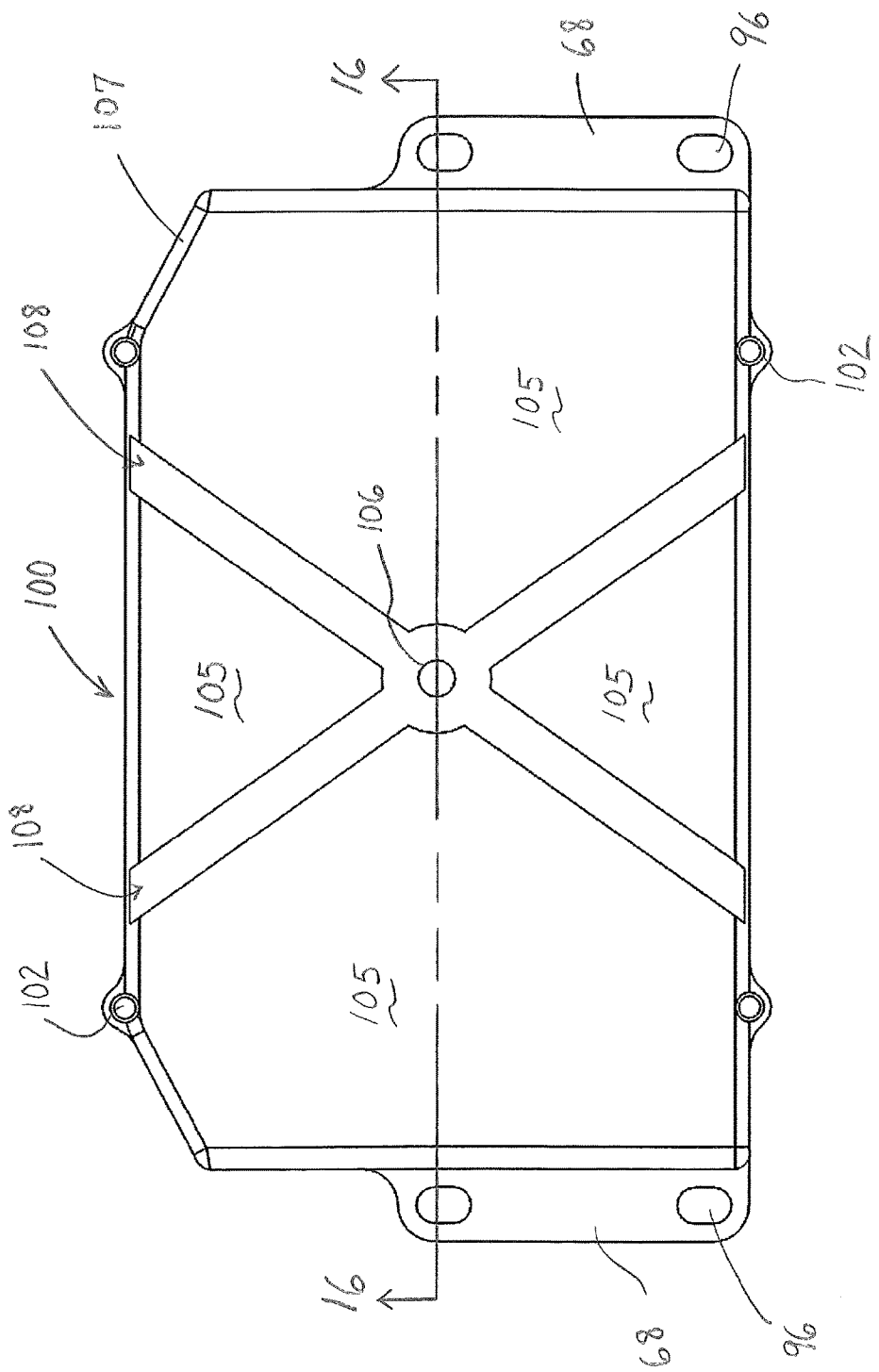
FIG. 15 is a top view of the battery enclosure in FIG. 14.

As shown in FIG. 13, the center section 16 may include a staff 90 that protrudes upwardly toward the user. At the end of the staff 90 is a handle 92 that the user can grip. The handle would provide stability for the rider, and because it is coupled to the center section 16, forward leaning of the handle would correspond to forward movement. If the user were to tip one of the sides 12,14 one direction and the other side 14, 12 in the opposite direction in the same amount, the angle of the handle would not change due to the gear driven coupling of the center section 16 to the sides 12,14. The handle 92 may include controls 94 or information about the scooter. The controls 94 would be in communication with the control board 36, 136. Further, the controls may include speakers, power switch, battery information, charge status, scooter speed, and other useful information or controls. Further, the staff 90 and handle 92 may be removable or collapsible to allow the scooter to be easily transported or stored. The staff 90 may be telescopically extendable between a stored position and an extended position. The scooter 10 is usable with or without the handle 92 and staff 90.

Figure 18:
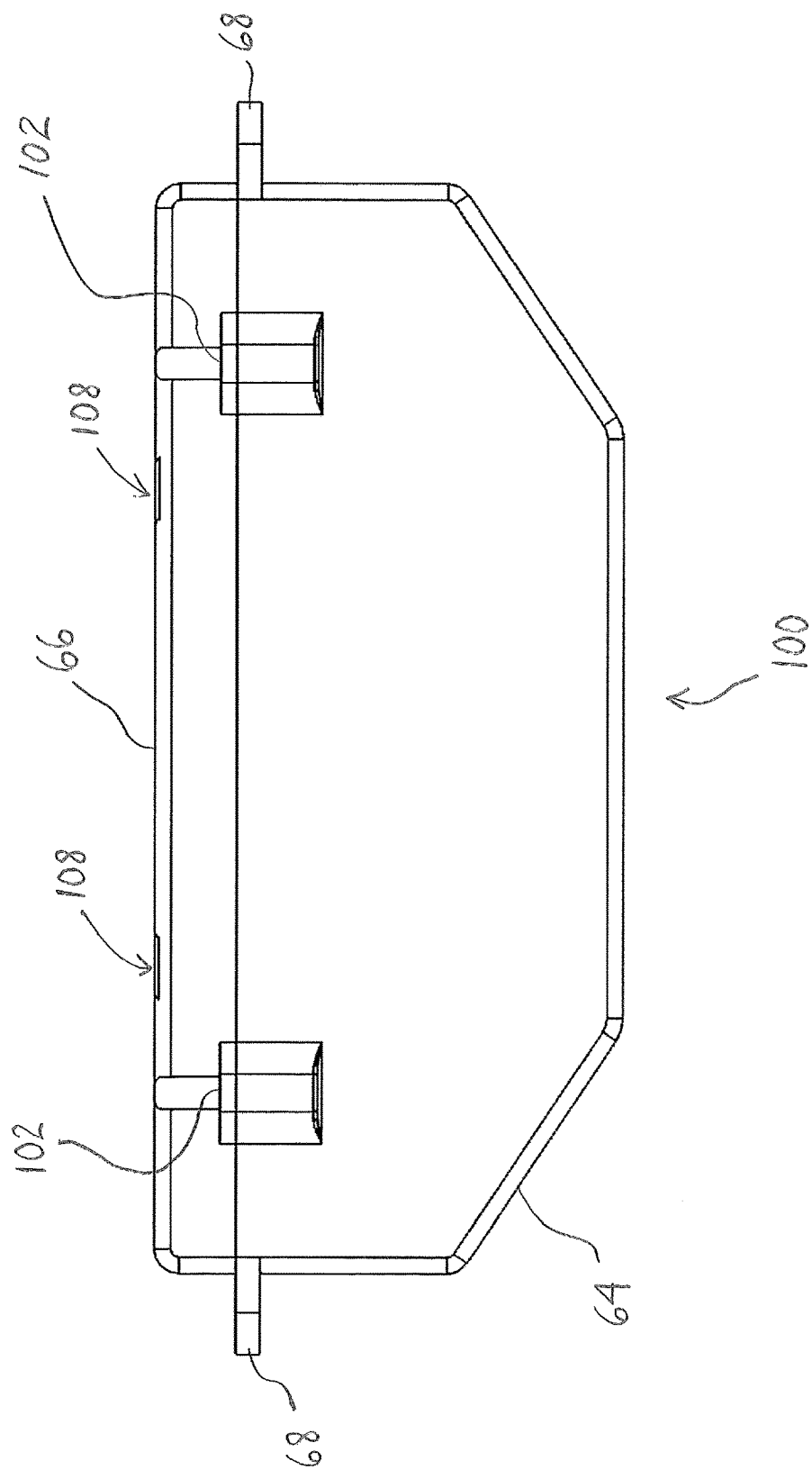
FIG. 18 is a rear view of the battery enclosure in FIG. 14.
Figure 19:
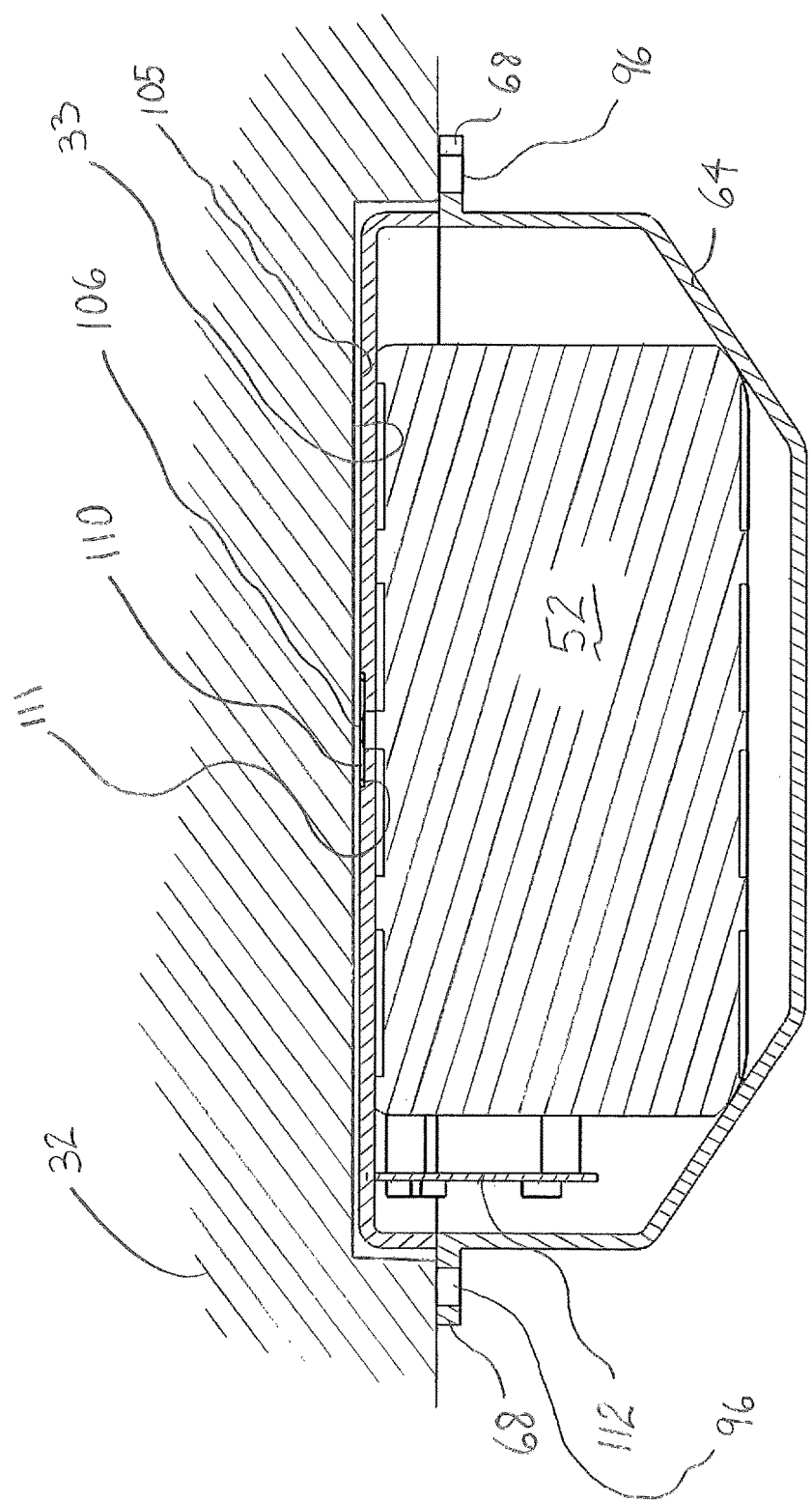
FIG. 19 is a front section view 16-16 of the battery enclosure of FIG. 15.
Figure 20:
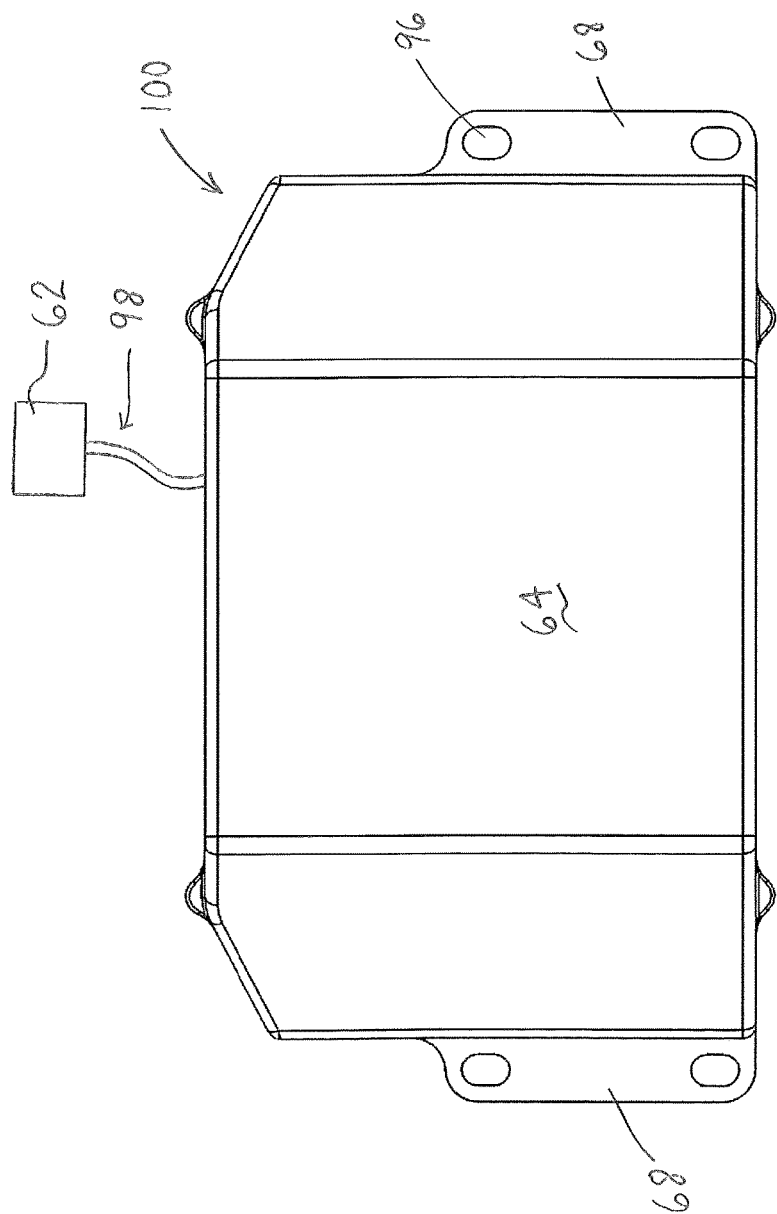
FIG. 20 is a bottom view of the battery enclosure.

A battery enclosure 100 as shown in FIGS. 14-21 has a lower shell 64 and an upper shell 66. The enclosure 100 is designed to be attached to another device, such as a balancing scooter, electric skateboard, or other battery powered device, such as the device shown in FIGS. 1-13. The enclosure 100 is shown simplified as battery 52, 152 in FIG. 8. The enclosure 100 is attached through mounting tabs 68 and holes 96 to the frame 32 as shown in FIG. 19. A power lead 98 extends outwardly from the enclosure 100 for the user to connect the enclosure 100 to external circuitry for charging and discharging of the batteries 52, 152 contained therein. The connection happens at the connector 62, located at the terminal end of the power lead 98.

As shown in FIG. 18, the upper shell 66 is affixed to the lower shell 64 through fasteners 102. As shown, the fasteners 102 are screws, but it is contemplated that rivets, bolts, welding, or other mechanical means are used to fasten the upper shell 66 to the lower shell 64. The shells 66, 64 are made out of a durable material, such as plastic, zinc, aluminum, steel, or fiberglass. As shown, they are made from a die-cast aluminum. Die-casting is well-known in the housing and enclosure art. The lower shell 64 is a bowl shape and is the primary shape on the inside to receive the batteries 52, 152. It is contemplated that the lower shell 64 further contains reinforcing ribs or mounting features that are not shown in the FIGS. The upper shell 66 may be sealed to the lower shell 64 to prevent any liquid, air, or gas infiltration through the life of the enclosure 100. When the upper shell 66 is affixed to the lower shell 64, an internal volume 104 is created within the enclosure 100.

Figure 16:
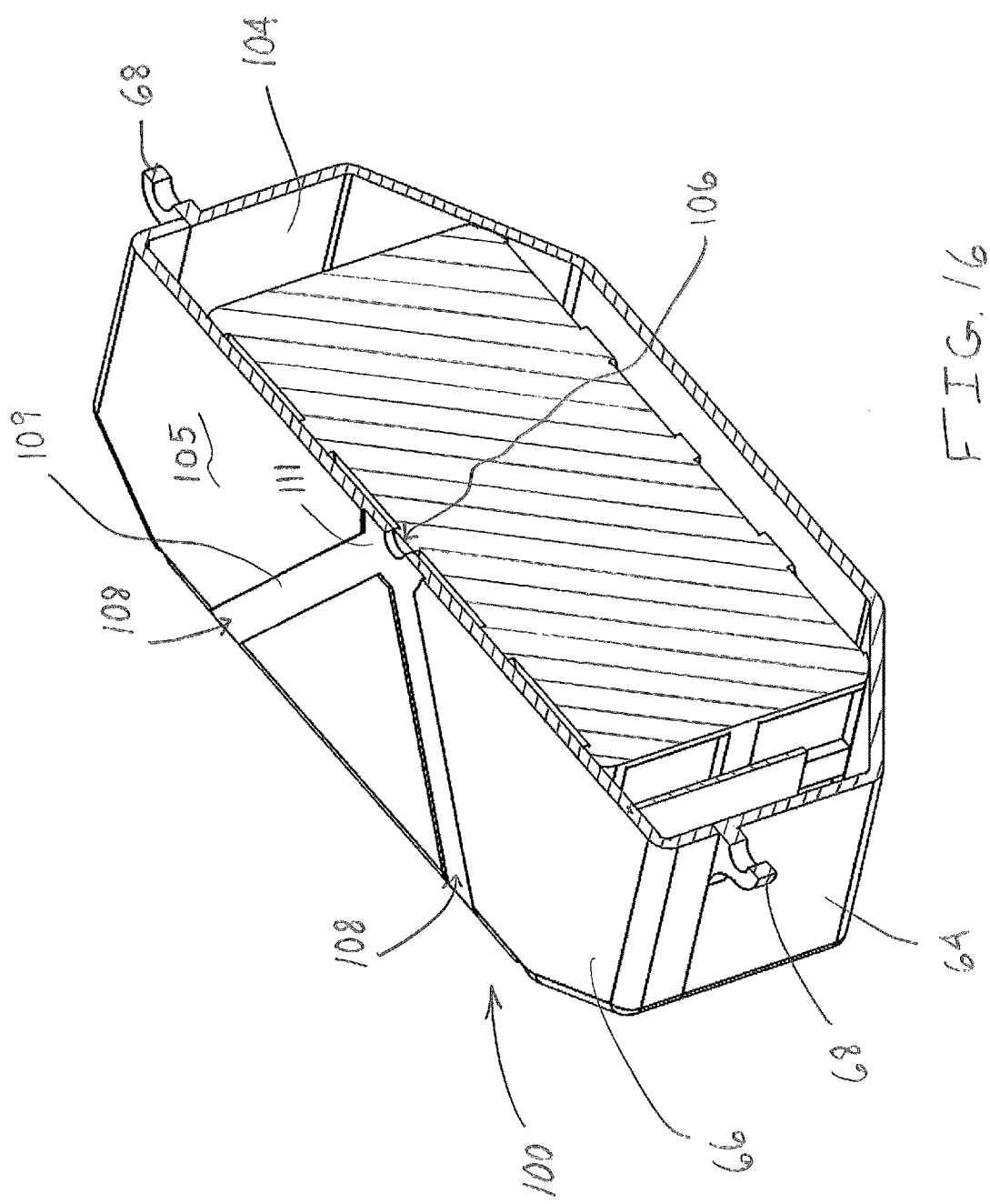
FIG. 16 is an isometric section view 16-16 of the battery enclosure of FIG. 15.
Figure 17:
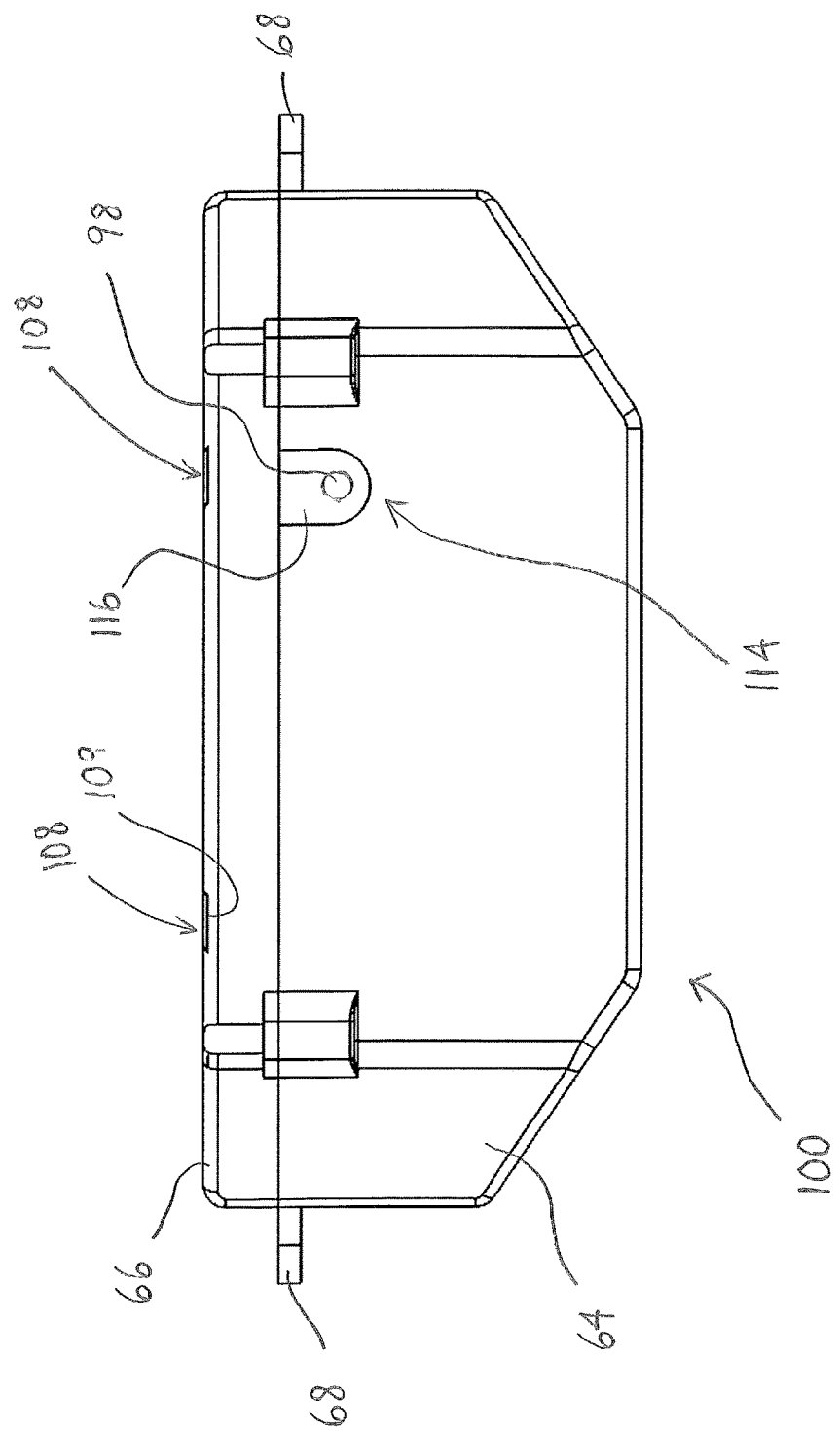
FIG. 17 is a front view of the battery enclosure in FIG. 14.

The shells 64, 66 may have tapped holes to receive the fasteners 102. The upper shell 66 has a top surface 105 with a perimeter edge 107 shown in FIG. 15 that is designed to be in contact or close proximity with a mating surface, such as the mating surface 33 on the frame 32. This proximity is shown in FIG. 19. As shown, the top surface 105 and mating surface 33 are planar, but the surfaces 33, 105 can be any shape or contour as long as they are complimentary. The mounting tabs 68 are used to affix the enclosure 100 to the frame 32 to maintain proper contact or spacing between the enclosure 100 and the mating surface 33 of the frame 32. The mating surface 33 does not have to be planar; it could be curved or irregular. The top shell 66 further contains a pressure release port 106, shown in FIGS. 15, 16, 19, and 21. The pressure release port 106 faces the mating surface 33. The portion of the mating surface 33 that is directly over the pressure release port 106 is typically made from or covered by a flame-retardant material, in the event any superheated gases exit the release port 106. Leading from the perimeter of the upper shell 66 and meeting at the release port 106 are a series of gas release channels 108. The channels 108 extend outwardly from the release port 106 to the perimeter edge 107. They are oriented to increase the distance from the release port 106 to the perimeter edge 107. As shown, there are four channels 108, but it is contemplated that a different number is used. The more channels 108 that are incorporated, the more any released gases are dispersed. The channels 108 have a surface 109 that is recessed from the top surface 105 and serve to create a path from the batteries 52 to the release port 106. The channels 108 interrupt the top surface 105. As shown, the surface 109 is coplanar with the surface 111 around the release port 106. It is common for the batteries 52 to consume nearly all of the internal volume of the enclosure 100, as shown in FIGS. 16 and 19. In the event a battery fails and begins to generate gas pressure, the internal volume 104 will begin to become pressurized. The release port 106 allows gases that are released from the batteries 52 exit the enclosure 100 and travel through the channels 108. It is contemplated that the release channels 108 are located on the mating surface 33 of the frame 32. The release channels 108 as shown are straight, but it is contemplated that the channels are convoluted to increase the distance between the release port 108 and the perimeter edge 107 of the top surface 105. The release channels 108 cooperate with the surfaces 105 and 33 to form tunnels that allow gases to escape in a controlled fashion.

The port 106 is covered by a valve 110, shown in FIG. 21. The valve 110 controls the release of any gas from the batteries 52. By controlling the release of gas, the potential for fire and property damage from a thermal event in the batteries 52 is significantly reduced. As shown in FIG. 21, the valve 110 may be a simple adhesive patch that adheres and seals to the port 106. It could also be a simple disc of metal with a score mark or other weakening feature that allows the metal to split at a predetermined pressure. It is further contemplated that a flame arrestor such as a dense mesh is present that would prevent any sparks or flame on one side of the valve 110 from passing through to the other side. The valve 110 may also be a check valve that allows gas to pass from one side to the other but not the other way around. Another possible embodiment of the valve 110 would involve a spring-loaded disc that would function as a check valve. It is further contemplated that the combination of any of the above embodiments could function as the valve 110.

An optional battery control board 112 is used to control the charging and discharging of the battery 52. The battery control board 112 can be used to monitor overall battery health, temperature, charge level, or other parameter to maintain safe operating conditions. The battery control board 112 may further include communication to a control board through the power lead 98 and connector 62 or a separate lead and connector. The battery control board 112 is for reducing or eliminating the potential of any external electrical malfunction from damaging or destroying the batteries 52. The battery control board 112 is connected to the power lead 98 and the batteries 52. The power lead 98 exits the enclosure 100 at an egress 114. As shown, the egress 114 is an aperture that is formed at the union of upper shell 66 and lower shell 64. A sealing grommet 116 protects the wires in the power lead 98 from being damaged at the egress 114 and also seals them. By sealing the wires, any vented gas from the batteries 52 is directed to the pressure release port 106.

In the unlikely event of a battery failure and subsequent outgassing, gas is released from the batteries 52 into the internal volume 104 of the enclosure 100. The gas begins to generate internal pressure in the enclosure 100. When a predetermined pressure is reached, the valve 110 opens to release the gas through the release port 106. Gas travels from the batteries 52 and then through the release port 106. Finally, it passes out through the release channels 108. The quantity of release channels 108 spreads out the released gas and reduces its temperature.

The enclosure 100 may include baffles or other convoluting feature may be incorporated to further disrupt the flow of any gas, thereby lowering the gas temperature and reducing potential ignition.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. A battery safety enclosure affixed to a vehicle having a frame with a frame surface, said safety enclosure comprising:
    a bottom shell and a top shell, said top shell mated to said bottom shell to create an interior cavity when said shells are mated, one of said shells having an enclosure surface and including an aperture extending therethrough into said cavity, said one shell including a channel having a bottom surface recessed from said enclosure surface, said channel intersecting said aperture to define a path from said aperture to an edge of said enclosure surface;
    an upper housing affixed to a lower housing to create an enclosed volume;
    a release port being an aperture through a wall in said enclosure, said release port having a valve adapted to release pressure from said interior cavity;
    a battery contained within said enclosed volume;
    a power lead in electrical communication with said battery;
    a battery control board located within said interior cavity, said battery control board in electrical communication with said battery and a connection lead extending through said enclosure and in electrical communication with said battery control board;
    said power lead extending from said enclosed volume to an outside of said enclosure; and
    said valve adapted to allow excessive pressure contained in said enclosed volume to be released to said outside of said enclosure.

2. The battery safety enclosure of claim 1, wherein said bottom surface of said channel is a planar surface being offset from said enclosure surface.

3. The battery safety enclosure of claim 1, wherein said enclosure is affixed to said vehicle at mounting tabs to fix said enclosure surface with respect to said frame surface of said frame.

4. The battery safety enclosure of claim 1, wherein said vehicle is a two-wheeled balancing scooter.

5. The battery safety enclosure of claim 1, further comprising a wheel rotatable about an axis by a motor, said axis fixed with respect to said frame, said motor in electrical communication with a control board, a level sensor and rider presence sensor in communication with said control board, said rider presence sensor switchable between an absent state defined by said rider presence sensor not detecting said rider and a present state defined by said rider presence sensor detecting said rider, when said rider presence sensor is in said present state, said control board is adapted to rotate said motor in a forward direction when said level sensor detects a forward tilt, said control board is adapted to rotate said motor in a reverse direction when said level sensor detects a rearward tilt.

\* \* \* \* \*